US006626761B1

(12) United States Patent
Okada

(10) Patent No.: US 6,626,761 B1
(45) Date of Patent: Sep. 30, 2003

(54) GAME MACHINE THAT PROVIDES SUPPORT TO PLAYERS BASED ON GAME HISTORY

(75) Inventor: Kazuo Okada, Tokyo (JP)

(73) Assignee: Aruze Co., Ltd., Tokyo (JP)

( * ) Notice: Subject to any disclaimer, the term of this patent is extended or adjusted under 35 U.S.C. 154(b) by 45 days.

(21) Appl. No.: 09/640,087

(22) Filed: Aug. 17, 2000

(30) Foreign Application Priority Data

Aug. 19, 1999 (JP) .......................................... 11-233199
Jul. 7, 2000 (JP) ...................................... 2000-211966

(51) Int. Cl.[7] ................................................ A63F 13/00
(52) U.S. Cl. .......................................... 463/43; 463/16
(58) Field of Search ................................ 463/1, 12–13, 463/16–23, 26–27, 30–31, 37, 43; 273/121 B, 143 R

(56) References Cited

U.S. PATENT DOCUMENTS 5,470,080 A * 11/1995 Naka et al. ................... 463/33
5,630,753 A * 5/1997 Fuchs ............................ 463/9
5,989,121 A * 11/1999 Sakamoto .................... 463/20
6,095,920 A * 8/2000 Sadahiro ......................... 463/2
6,106,393 A * 8/2000 Sunaga et al. ................ 463/20
6,190,254 B1 * 2/2001 Bennett ....................... 463/13
6,270,409 B1 * 8/2001 Shuster ........................ 463/20

* cited by examiner

*Primary Examiner*—Joe H. Cheng
*Assistant Examiner*—K. Nguyen
(74) *Attorney, Agent, or Firm*—Bacon & Thomas, PLLC

(57) ABSTRACT

A game machine and a medium storing a game program and readable by a computer, providing properly under an appropriate circumstance a support, showing an excellent navigation function, basically for beginners but not forming unequalness to advanced players without perverted equality between beginners and advanced players and only the nominal support, not like the case uniformly applying the support functions, wherein actuation of a support means is allowed on the basis of a latest game history going back from a latest time, so that actuation of the support means is allowed or not depending upon the latest game history, for example, when the number of games under an internally determined Bonus become larger than a predetermined value, wheels' rotation number may be reduced, an aiming marker setting allowed, wheels bands indicated laterally of simulated wheels 3L, C, R, or results of internal winning determination informed.

4 Claims, 21 Drawing Sheets

F i g. 4

List of winning combinations

| | | | Left wheel 4L | Middle wheel 4C | Right wheel 4R | Wins |
|---|---|---|---|---|---|---|
| ① Big Bonus | | "Red 7 "-"Red 7 "-"Red 7 " | | | | 3 sets of Regular Bonuses. Ending after 3 sets of Regular Bonuses or 30 games. |
| | | "Bird"-"Bird"-"Red 7 " | | | | |
| ② Regular Bonus | | "BAR"-"BAR"-"BAR" | BAR | BAR | BAR | 12 times of Jack Games. Ending after winning 8 times in Jack Games, or after 12 times of Jack Games. |
| | | "Bird"-"Bird"-" BAR" | | | BAR | |
| ③ Bit of Wins | Main Bit | "Feather"-"Feather"-"Feather" | | | | 10 tokens paid, 12 in Big Bonus. |
| | | "Grape"-"Grape"-"Grape" | | | | 14 tokens paid |
| | | "Feather"-"Feather"-"Bird" | | | | One token paid, three in Big Bonus. |
| | | "Cherry"-ANY-ANY | | ANY | ANY | 2 tokens paid |
| ④ Replay | | "Replay"-"Replay"-"Replay" | AAA | AAA | AAA | Next game available, without use of token(s). Entering Regular Bonus in playing Big Bonus. |
| ⑤ Jack Game | | "Red 7 "-"Replay"-"Replay" | | AAA | AAA | 15 tokens paid |
| | | "BAR"-"Replay"-"Replay" | BAR | AAA | AAA | |
| | | "Replay"-"Replay"-"Replay" | AAA | AAA | AAA | |

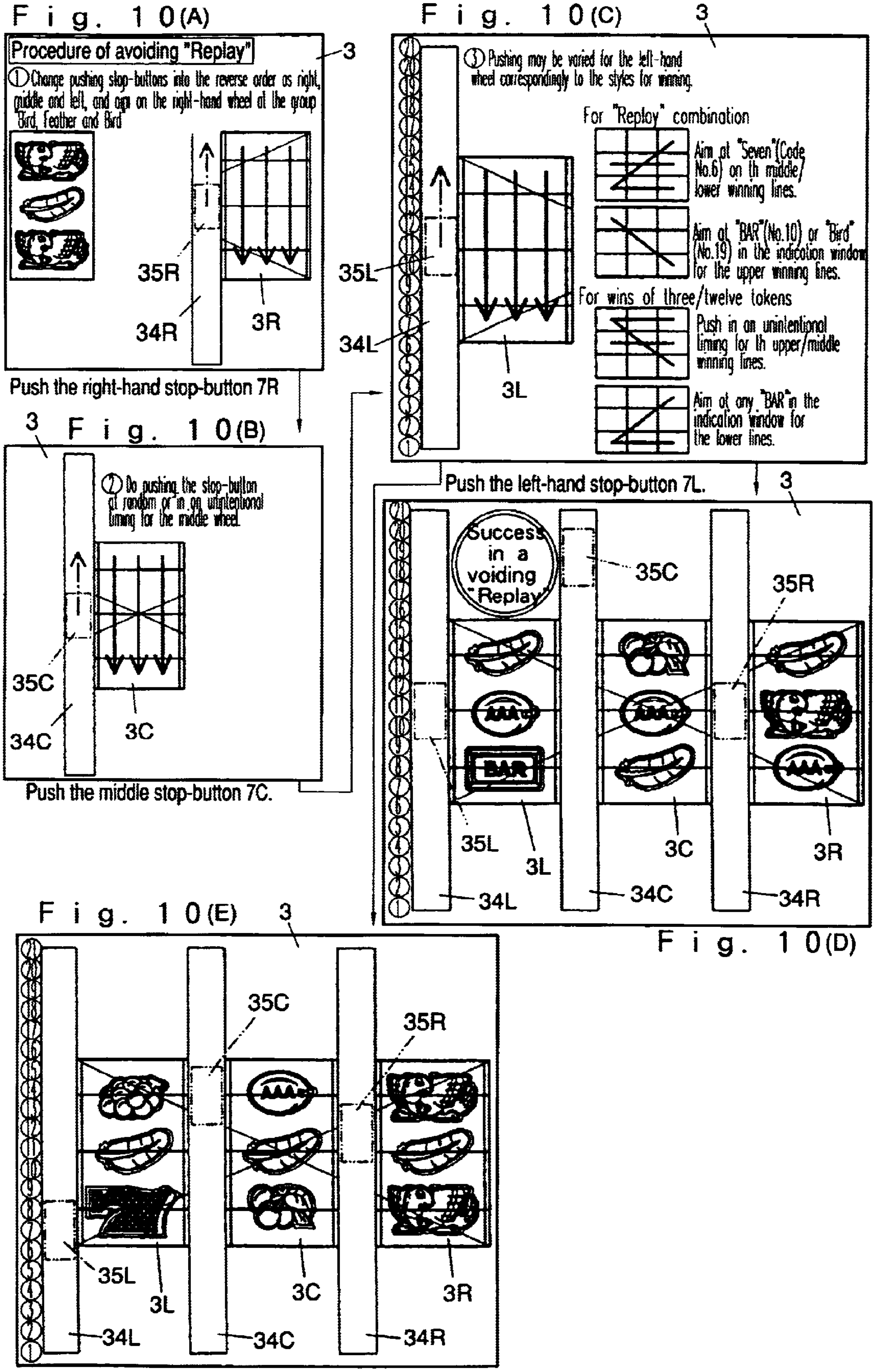
Fig. 10(A)
Procedure of avoiding "Replay"
① Change pushing stop-buttons into the reverse order as right, middle and left, and aim on the right-hand wheel at the group Bird, Feather and Bird
3
35R
34R
3R
Push the right-hand stop-button 7R
Fig. 10(B)
3
② Do pushing the stop-button at random or in an unintentional timing for the middle wheel.
35C
34C
3C
Push the middle stop-button 7C.
Fig. 10(C)
3
③ Pushing may be varied for the left-hand wheel correspondingly to the styles for winning.
For "Replay" combination
Aim at "Seven" (Code No.6) on th middle/lower winning lines.
Aim at "BAR" (No.10) or "Bird" (No.19) in the indication window for the upper winning lines.
For wins of three/twelve tokens
Push in an unintentional timing for th upper/middle winning lines.
Aim at any "BAR" in the indication window for the lower lines.
35L
34L
3L
Push the left-hand stop-button 7L.
3
Success in a voiding "Replay"
35C
35R
35L
3L
3C
3R
34L
34C
34R
Fig. 10(D)
Fig. 10(E)
3
35C
35R
35L
3L
3C
3R
34L
34C
34R

Fig. 12

List of various supporting functions

| stages / manners of support | In usual games: Operation trigger (to watch) | In usual games: Detail of support | With Bonus internally determined: Operation trigger (to watch) | With Bonus internally determined: Detail of support | In Big Bonus: Operation trigger (to watch) | In Big Bonus: Detail of support |
|---|---|---|---|---|---|---|
| Wheels' rotation adjusted | | | 14 games or less after flagging | High speed | Not increment at end of 2nd set Regular Bonus :221 or more | High speed |
| | | | 15 games or more 25 games or less after flagging | Middle speed | Not increment at end of 2nd set Regular Bonus :191 or more, 220 or less | Middle speed |
| | | | 26 games or more after flagging | Low speed | Not increment at end of 2nd set Regular Bonus :191 or less | Low speed |
| Putting Aiming Markets | | | 15 games or more 25 games or less after flagging | Marker setting allowed | less than 10 ordinary games remaining, Regular Bonus not yet won | Marker setting allowed |
| Wheels' bands indicated | Number of games after "Bonus". 500 or more.. | Wheels' bands shown | 9 games or less after flagging | None | In Big Bonus | Wheels' bands shown and Indication windows scrolled |
| | | | 10 or more, 30 or less after flagging | Wheels' bands shown | | |
| | | | 21 more after flagging | Wheels' bands shown and Indication windows scrolled | | |
| Internal determination results informed | Number of games after "Bonus". 300 or less. | None | 5 games or less after flagging | None | After end of 1st set Regular Bonus | Entering Regular Bonus, "Replay" informed |
| | Number of games after "Bonus". 301 or more, 600 or less. | Winning styles of two/four tokens informed | 5 or more, 15 or less after flagging | All of "Bit of Win" informed | After end of 2nd set Regular Bonus | All of winning styles informed |
| | Number of games after "Bonus". 601 or more. | Winning styles of one/ten tokens informed | 16 or more after flagging | All of winning styles informed | | |
| Technique shown | | | | | 10 ordinary games or more, Net increment zero or less before initial Regular bonus | Procedure for avoiding "Replay" shown |
| Games results indicated | | | Upon winning "Bonus". | Games history between "Bonuses" shown | Upon end of Big Bonus | Games History in Bonus and Total Games History shown |

Fig. 17

Table of points addition for specific levels

| Levels | Differentiation | Internal determination flagging (winning styles) | | | | | | |
|---|---|---|---|---|---|---|---|---|
| | | Grape | Feather – Feather – Bird | Feather – Feather – Feather | 4 tokens Cherry | 2 tokens Cherry | B B | R B |
| 1 | winning | +10 | +7 | 0 | +4 | +2 | — | — |
| | failure | −1 | −1 | 0 | −1 | 0 | — | — |
| 2 | winning | 0 | +10 | 0 | +2 | 0 | — | — |
| | failure | −1 | −2 | 0 | −1 | −1 | — | — |
| 3 | winning | +3 | +3 | 0 | +2 | +1 | — | — |
| | failure | −3 | −3 | 0 | −2 | −1 | −10 | — |
| 4 | winning | +1 | 0 | 0 | 0 | 0 | — | — |
| | failure | −4 | −3 | 0 | −3 | −3 | −30 | −25 |

Fig. 18

Table of level setting

| Levels | Point (s) |
|---|---|
| 1 | 50 or less |
| 2 | 51 to 100 |
| 3 | 101 to 150 |
| 4 | 151 or more |

Fig. 19

Table for selection of the informing features for specific levels

| Levels | Informing features | | Internal determination flagging (winning styles) | | | | | | |
|---|---|---|---|---|---|---|---|---|---|
| | Bearer | Items (*) | Grape | Feather – Feather – Bird | Feather – Feather – Feather | Two/Four tokens Cherry | B B | R B | blank |
| 1 | Large | A | 128 | 0 | 0 | 0 | 0 | 0 | 0 |
| | | B | 0 | 128 | 0 | 0 | 0 | 0 | 0 |
| | | C | 0 | 0 | 128 | 0 | 0 | 0 | 0 |
| | | D | 0 | 0 | 0 | 128 | 0 | 0 | 0 |
| | | E | 0 | 0 | 0 | 0 | 0 | 0 | 0 |
| | | F | 0 | 0 | 0 | 0 | 0 | 0 | 0 |
| | | None | 0 | 0 | 0 | 0 | 128 | 128 | 128 |
| 2 | Medium | A | 80 | 5 | 2 | 5 | 3 | 2 | 9 |
| | | B | 10 | 90 | 5 | 1 | 2 | 1 | 5 |
| | | C | 5 | 2 | 90 | 3 | 10 | 1 | 7 |
| | | D | 20 | 1 | 3 | 110 | 1 | 3 | 11 |
| | | E | 1 | 0 | 15 | 1 | 111 | 101 | 2 |
| | | F | 12 | 30 | 13 | 8 | 1 | 20 | 13 |
| | | None | 0 | 0 | 0 | 0 | 0 | 0 | 81 |
| 3 | Small | A | 0 | 0 | 0 | 0 | 0 | 0 | 0 |
| | | B | 0 | 0 | 0 | 0 | 0 | 0 | 0 |
| | | C | 0 | 0 | 0 | 0 | 2 | 0 | 0 |
| | | D | 0 | 0 | 0 | 0 | 0 | 0 | 0 |
| | | E | 0 | 0 | 0 | 0 | 0 | 0 | 0 |
| | | F | 20 | 30 | 40 | 20 | 0 | 0 | 20 |
| | | None | 108 | 98 | 88 | 108 | 126 | 128 | 108 |
| 4 | None | A | 0 | 0 | 0 | 0 | 0 | 0 | 0 |
| | | B | 0 | 0 | 0 | 0 | 0 | 0 | 0 |
| | | C | 0 | 0 | 0 | 0 | 0 | 0 | 0 |
| | | D | 0 | 0 | 0 | 0 | 0 | 0 | 0 |
| | | E | 0 | 0 | 0 | 0 | 0 | 0 | 0 |
| | | F | 0 | 0 | 0 | 0 | 0 | 0 | 0 |
| | | None | 128 | 128 | 128 | 128 | 128 | 128 | 128 |

(*)

Item A

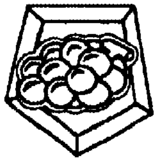

Grape

Item B

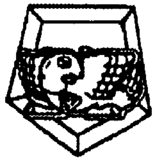

Feather – Feather – Bird

Item C

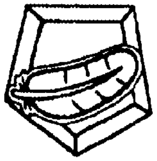

Feather – Feather – Feather

Item D

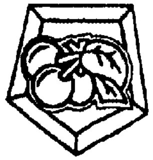

Two/Four tokens Cherry

Item E

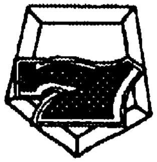

BB、RB

Item F

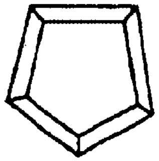

Fig. 20(A) Bearer (large) Level 1
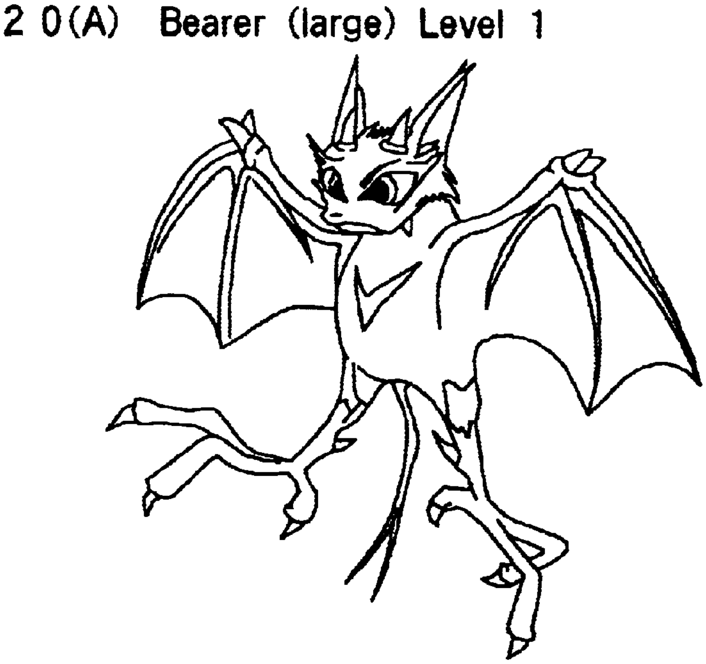
Fig. 20(B) Bearer (medium) Level 2
Fig. 20(C) Bearer (small) Level 3
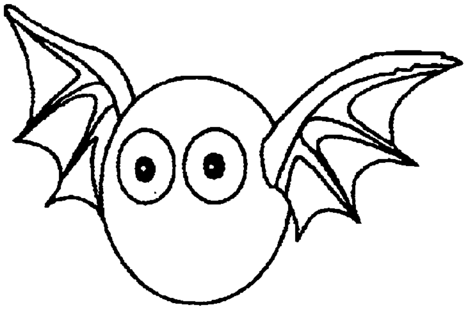

GAME MACHINE THAT PROVIDES SUPPORT TO PLAYERS BASED ON GAME HISTORY

DETAILED DESCRIPTION OF THE INVENTION

1. Field of the Invention

The present invention relates to a game machine wherein the machine has such skill-intervention that users or players' levels of skill or senses for the game may be strongly reflected on the results of the game, or a game machine which provides room or elements players can attack, and a medium memorizing a game program and readable by a computer which game program allows the computer to perform a simulation game of the game machine having the skill-intervention and room or elements attacked by players.

2. Prior Art

In recent years, game machines such as Pachislot and Pachinko have been combined with control by a microcomputer so as to have various and deep playability. Books such as knowhow magazines for attacks in the game introduce specifications and factors of popular game machines which players can attack and which have been simulated by a household computer software to enable players to enjoy the games simulation at home. In playing the game with Pachinko or Pachislot which are controlled by a microcomputer housed therein, players may win or lose the game fortunately or unfortunately on the one hand while there are definitely elements or factors of the game machines within their control properties and habitual behaviours to be attacked by players on the other hand, so that players' levels of skill and senses for the game are apparently reflected on the games results, resulting in a large difference in wins between skillful game-players and beginners.

In Pachislot, to receive payoff of tokens (used for the game and called "coins", medals, etc.), there are required such facts that random numbers taken at the instant of actuation of the start lever is "internally determined" to fall under an extent of a winning style, and that the stop button is to be pushed in a predetermined timing to allow specific designs or pictures (corresponding to the internally determined winning style) to be aligned, in a drawing section containing four designs or pictures, with the winning lines. Hence, players essentially need to improve an operating technique of the stop buttons while understanding specific arrangement of the pictures on the wheels, and precisely grasp the content of the internal determination in order to obtain more tokens in the game.

In more detail, Bonuses such as Big Bonus or Regular Bonus may be internally determined, as foregoing, in a game upon actuation of the operating lever to make such first game as a (Bonus-)flagged game. Even when the required combination of pictures corresponding to the Bonus is not achieved in this flagged game, the Bonus-flagging can be carried over to a next game and those following the same and chances are given over and over again until the Bonus winning combination is achieved.

However, pictures required for achieving Bonus provided on each wheel are few substantially, and it is not everyone such people who can readily precisely grasp the achievement of Bonus-flagging from a special pattern formed by stopped pictures on the wheels and suggesting a coming win or from an informing feature for Bonus-lagging by means of lamps, etc. Thus, beginners need to spend many games in vain after an initial game (wherein the Bonus flag is achieved) and until they finally achieve a combination of pictures corresponding to the Bonus.

In the general games most regularly frequently performed prior to the internally determined Bonus, available winning styles are "Bit of Wins" or Replay whose internal determination cannot be carried over to next or following games as not like the Bonus-flagging. Thus, any winning styles other than those fully ensured of drawing would fail of winning. In this case, there are an attacking technique called DDT method aiming at a specific picture in view of a special pattern formed by the pictures on the wheels to avoid failure of winning, and an effective technique on the basis of DDT added with the probability of Bit of Wins winning and time efficiency required for the aiming technique. Beginners are poor in knowledge of such attacking techniques or in ability of "precisely aiming" to read precisely specific pictures on the rotating wheels and push the stop buttons in a proper timing, more or less resulting in failure of winning the Bit of Wins.

In the games related to Big Bonus, it is useful to play the provided Bonus games (other than early performing allowed maximal two or three games of Regular Bonus, initiated by a combination of three "Replay" pictures) while adopting an attacking technique called "Avoid Replay" wherein during usual games (in a limit of times, e.g., 30 times) in the Big Bonus games, a combination of three "Replay" pictures is intentionally avoided to refrain from entering Regular Bonus in order to properly win Bit of Wins having higher probability of winning compared with usual cases. It is quite hard for beginners poor in the precisely aiming ability to play games in the above manner, thereby they can obtain merely reduced number of tokens in comparison with advanced or skillful players.

Moreover, in case of a game machine mounting a challenge time function (CT) wherein control to stop wheels on the basis of drawing random numbers is stopped after ending the Big Bonus games, there is an attacking technique called CT Max method wherein during CT function the aiming is used to freely win Bit of Wins, so that the number of tokens can be kept near a prescribed number of net increment while keeping a longer term for having chances of internal determination of Bonuses. Beginners poor in the precisely aiming ability cannot make use of the drawing-assist of four pictures during the CT function, and rather loses tokens, and players having a medium skill not so good at the precise aiming operation compared with the advanced players causes the number of kept tokens to exceed the prescribed net increment before ending a prescribed number of games during CT operation, thereby early losing chances of entering again the Bonus games under a favourable condition affluent in tokens.

To play the games advantageously by use of the foregoing attacking techniques, it is required to improve the precisely aiming ability with understanding the arrangement of pictures on the wheels, grasp precisely the internal determination results in specific situations of each game, and learn optimal operating procedures at the specific times on the above conditions. It is hard for ordinary people to obtain knowledges and operating skill of the game machine to the extent as above. Beginners are not fully satisfied with the game machine. Variation of people playing the game becomes limited, and some generation actually keep the game at a distance despite of various gaming properties.

Applying support functions for complementing players skill to the game machine is reviewed here. The support functions may be informing an operation timing (to cause an aimed picture to stop on the winning lines) by use of an indication means such as lamps, liquid crystal display, etc., a sound generating means such as a speaker etc., and a vibration generating means such as a vibrator, etc.; reducing speed of rotation of wheels (to cause players to easily recognize specific pictures on the wheels) upon meeting the predetermined conditions such as the time of achieving the Bonus-flagging; indicating arrangement of pictures on the wheels to clarify specific pictures' positions on the wheels; indicating simulated wheels synchronized with the main wheels on a liquid crystal display screen, etc., and also indicating a marking on an aimed picture of such simulated wheels or emphasizing such picture to cause players to easily recognize the aimed picture(s); teaching a most advantageous attaching technique correspondingly to occasional situation of games; indicating achieved flag(s) to suggest what winning style is to be aimed in the game; and indicating graphs showing failure of winning the wins to enable players to estimate the games.

In case that the above-mentioned support functions are merely added to the game machine, the support functions work uniformly to all of players not differentiated into beginners and advanced skillful players. It may happen that some support functions which are not required for some players would work to the same irrespective of their intent, or some support functions required for some players do not work when required.

In detail, careful support functions for beginners make simple and easier the game uniformly to all players, so that they are not required for advanced players who very much practiced the techniques, do not give them interest and cannot truly make equalization. On the other hand, if support functions for the advanced players are applied uniformly, beginners do not at all understand it and the game is made complex vainly, so that the support functions do not serve as a support.

BRIEF DESCRIPTION OF THE INVENTION

An object of the present invention is to provide a game machine, and a medium storing a game program and readable by a computer, the game machine having an excellent navigation function properly applying supports under a suitable condition not by merely uniformly actuating the support functions but by actuating the support functions in view of the latest game history going back from a latest time without perverted equality between beginners and advanced players and only the nominal support functions in order to provide support basically for assisting beginners without causing inequality to advanced players.

According to the invention, to achieve the task, provide a game machine having a support means favouring players wherein there is provided a support allowing means which allows actuation of the support means on the basis of the latest game history going back from a latest time.

According to the invention, to fairly and properly carry out supporting for enabling winning Bonus, comprise a plural lines of a changeable indication means which changeably indicates a plurality of designs or pictures including those corresponding to Bonus, and a stop means for stopping a predetermined design or picture of each line on a winning line corresponding to an operation timing, and the invention allows a support means useful for causing designs for Bonus to be aligned on the winning line when the Bonus designs are not aligned on the winning line to result in no winning Bonus after a predetermined number of games from a first game in which Bonus is internally determined and flagging is achieved in a latest game history. The Bonus referred to here includes both of Big Bonus and Regular Bonus.

According to the invention, to facilitate improvement of skill of middle-grade players and advanced players, allow actuation of a support means useful for estimation of the game when the Bonus designs are aligned on the winning line to realize winning Bonus in a latest game history.

According to the invention, to make support fairly and suitably to cause benefit obtained in Big Bonus to be kept at a degree over a predetermined amount, comprise a plural lines of changeable indication means, which changeably indicates a plurality of designs or pictures including those for Bonus and provides a winning style of Big Bonus that is a combination of an effective usual games in limited times and a Regular Bonus in limited times and ends depending on these limitations; a stop means for stopping a predetermined design or picture of each line on a winning line corresponding to operation timing; and the invention allows actuation of a support means useful for increase of obtained benefit when provided benefit is few during Big Bonus in a latest game history.

According to the invention, to facilitate improvement of technical levels of middle-grade players and advanced players, allow actuation of a support means useful for estimation of the game when Big Bonus ends in a latest game history.

According to the invention, to provide proper support in usual games most frequently performed prior to internal winning determination of Bonus, comprise a plural lines of changeable indication means which changeably indicates a plural designs or pictures including those for Bonus and for Bit of Wins; a stop means for stopping a predetermined design or a picture of each line on a winning line corresponding to operation timing, and allow actuation of a support means useful for causing designs or pictures related to winning to be aligned on a winning line when Bonus is not achieved again after a predetermined number of games from ending of a preceding Bonus winning in a latest game history.

According to the invention, to apply a support fairly under a proper situation, provide a game machine having a support means favouring players wherein there is provided a support allowing means which allows actuation of the support means when specific conditions which may occur at a predetermined probability during the game are achieved.

According to the invention, to reduce failure of winning internally determined wins, comprise a plural lines of changeable indication means which changeably indicates a plurality of designs or pictures including those for Bonus and Bit of Wins, and a stop means for stopping a predetermined design or picture of each line on a winning line corresponding to operation timing, and the support means informs players a result of internal winning determination of a specific winning style.

According to the invention, to reduce failure of winning Bit of Wins internally determined while enabling the Bonus a large winning to be expected, cause said specific winning style subjected to informing to include Bit of Wins but not Bonus.

According to the invention, to properly support beginners, provide a game machine having a support means favouring players wherein there are provided a plural lines of changeable indication means changeably indicating a plurality of designs or pictures, a stop means for stopping a predetermined design or Picture of each line on a winning line corresponding to operation timing, and a support allowing means which allows actuation of the support means correspondingly to a state of failure in winning internally determined wins or winning styles.

According to the invention, to save to a certain extent a disadvantage of beginners who tend to fail to win the internally determined wins, provide the support means that informs players results of internal winning determination of specific winning styles.

According to the invention, to further kindly support beginners, provide higher reliability of informing results of internal winning determination correspondingly to more failure in winning internally determined wins or winning styles.

According to the invention, to apply fairly and properly a support to players in a simulated game with a medium (such as a compact disc or ROM cartridge) readable by a computer, provide a medium storing a game program and readable by a computer, the medium comprising a support procedure description describing a dealing procedure for support functions favouring players, the game program causing the computer to fulfill a game support method having a monitor step monitoring a latest game history going back from a latest time and an allowing step allowing actuation of the support functions on the basis of the monitored latest game history.

Next, functional effects of those inventions will be detailed.

In the invention, actuation of the support means is allowed on the basis of the latest game history going back from a latest time. That is, actuation of the support means is allowed or not depending upon the latest game history. Hence, there causes no perverted equality between beginners and advanced players and prevents the support means from being only the nominal as the case uniformly applying the support functions. The support functions can be provided properly under a proper condition.

In the invention, actuation of the support means useful for aligning the design or picture for Bonus on the winning line is allowed when the Bonus design or picture is not aligned on the winning line, resulting in not winning Bonus after a predetermined number of games from a game in which the Bonus was internally determined and flagging was achieved. Hence, beginners who cannot win Bonus and spend many games vainly can be saved. The support means saves beginners' disadvantage over a predetermined level. Advanced players who are able to early win Bonus are inherently not required to be provided with such support means. Hence, there causes no unequalness to advanced players who are not given the supporting.

In the invention, actuation of the support means useful for estimation of the game is allowed when the Bonus design or picture is aligned on the winning line to enable players to win Bonus. Hence, the middle-grade and advanced players can be applied with pleasure of estimating the game and facilitated to improve technical skills. Thus, the middle-grade and advanced players are also fascinated by the support means.

In the invention, actuation of the support means useful for increase of benefit to be obtained is allowed when provided benefit in the midst of Big Bonus is few. Thus, disadvantage of players who have not fully enjoyed benefit to be obtained inherently in Big Bonus can be saved to a predetermined extent. Players having enjoyed full benefit are less required to be applied with the support. There forms no unequalness that such players are not given the support.

In the invention, actuation of the support means useful for estimation of the game is allowed when Big Bonus ends. Hence, the middle-grade and advanced players are provided with enjoyment estimating the game upon end of Big Bonus and facilitated to improve technical skill, whereby they also are fascinated by the support.

In the invention, actuation of the support means useful for aligning the winning designs on the winning lines is allowed when Bonus is not achieved again after a predetermined number of games from the end of a preceding Bonus. A main cause that Bonus is not achieved for a long time may be often such fact of inevitability not relating to players technical levels that selection of random numbers does not lead to internal winning determination of Bonus, which is just bad luck for players. It is effective to make as small as possible failure in winning Bit of Wins under the circumstances. Actuation of the support means useful for aligning winning designs on the winning lines is allowed to save to a predetermined extent disadvantage of beginners who tend to fail to win Bit of Wins. From the feature, advanced players who usually make use of DDT method, etc., re also given such merits that a strict aiming can be dispensed with to mitigate players' fatigue. The support feature does not form unequalness to the Advanced players.

In the invention, actuation of the support means favouring players is allowed when specific conditions occuring at a predetermined probability in the game are achieved. In detail, actuation of the support means is allowed or not depending upon achievement or none of the specific conditions occuring at a predetermined probability in the game. Hence, the support can be applied fairly equally under a proper situation not like the case uniformly applying the support means.

In the invention, results of internal determination of specific winning styles are informed to players, so that players understand what designs to be aimed with operation of stop-buttons. Hence, failure of winning the specific winning styles internally determined can be reduced.

In the invention, the specific winning styles subjected to informing include Bit of Wins but not Bonus. Thus, failure in winning Bit of Wins internally determined can be reduced while Bonus (a high winning style) can be subjected to draw lots.

In the invention, actuation of the support means is allowed depending upon a situation of failure in winning the internally determined winning styles. That is, actuation of the support means is allowed or not allowed correspondingly to specific situation of failure in winning the internally determined wins. Hence, beginners can be properly supported not like the case uniformly applying the support functions.

In the invention, the support informing results of internal winning determination of specific winning styles is provided depending upon situation of failure in winning the internally determined winning styles. Thus, what designs to be aimed with operation of stop-buttons are informed to save to a predetermined extent disadvantage of beginners who tend to fail to win the internally determined winning styles.

In the invention, reliability of informing results of internal determination becomes higher depending upon more failure in winning the internally determined winning styles. Hence, kind support can be provided to beginners who tend to fail to win the internally determined winning styles, and saves disadvantage of such players effectively.

In the invention, the monitor step monitors a latest game history going back from a latest time, and actuation of the support functions described in the support disposing procedure description is allowed by the allowing step on the basis of the monitored latest game history. In detail, actuation of the support means is allowed or not allowed depending upon the latest game history. Hence, there causes neither perverted equality between beginners and advanced players nor only the nominal support not like the case uniformly applying the support functions. The support can be applied fairly and properly in a simulated game by means of such a medium readable by a computer as a compact disc, ROM cartridges, etc.

The present invention will be further clarified with referring to the accompanied drawings.

BRIEF DESCRIPTION OF THE DRAWINGS

FIG. 4 is a list of winning styles or wins in the game machine.

FIG. 10 is an explanatory view for showing operational procedure among various support means.

FIG. 12 is a list of various support means.

FIG. 17 is a table of points addition for specific levels.

FIG. 18 is a table for level-setting.

FIG. 19 is a table for selecting informing features for specific levels.

FIG. 20 is an explanatory view for a bearer.

PREFERRED EMBODIMENTS OF THE INVENTION

Figure 1:
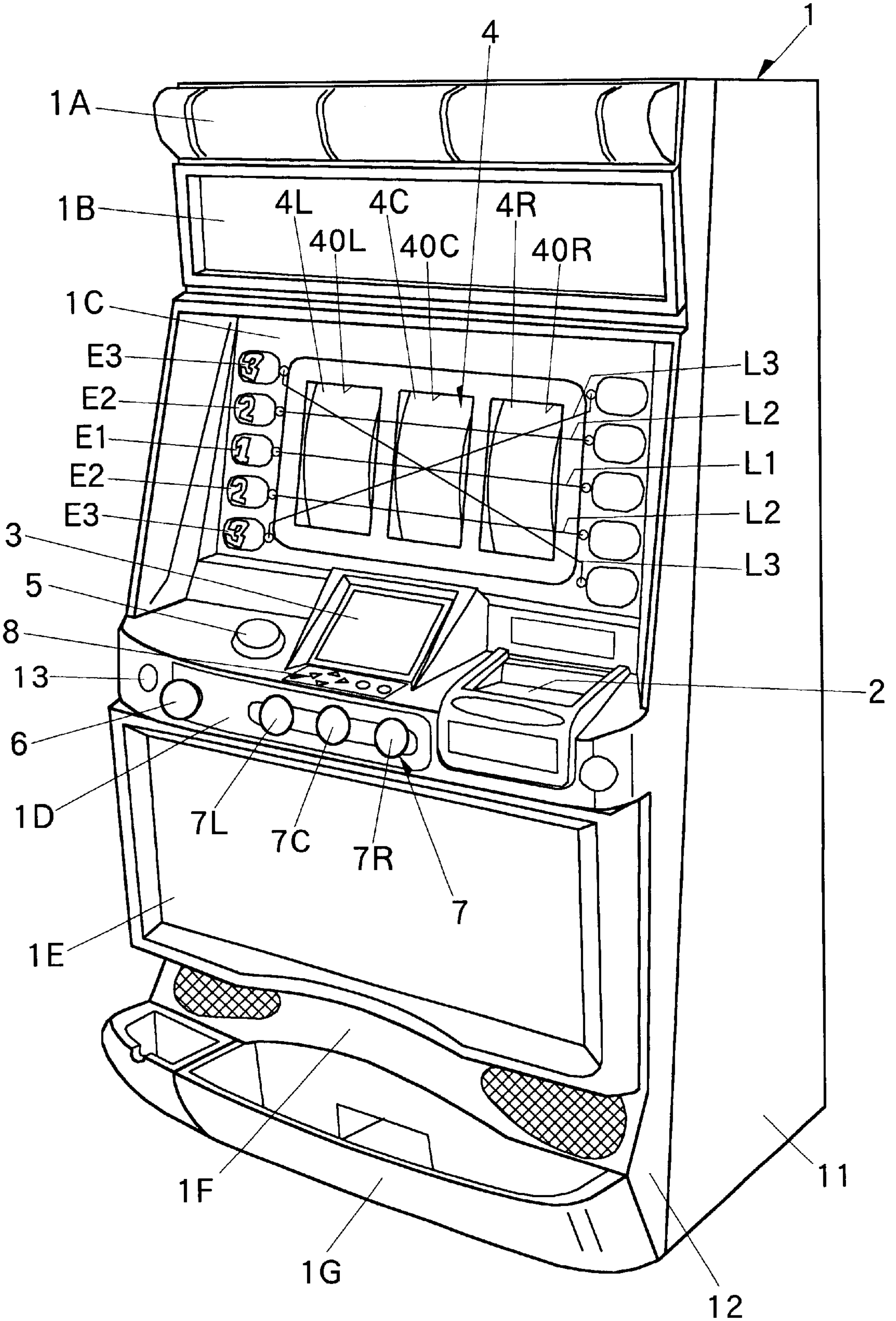
FIG. 1 is a perspective view showing a game machine applied with the present invention.

FIG. 1 shows a slot machine of "Pachinko" type, i.e., a Pachislot machine applied with the present invention. Used as tokens (usually called "coins") are games medals about 25 mm in diameter. The machine body 1 comprises a box-shaped casing 11 and a front door 12 openable forwards and has at the top a game-situation indicator 1A, and downwardly, a payoff table panel 1B, a wheels panel 1C, a switches board 1D, a lower panel 1E, a front-speaker panel 1F, and a payoff return 1G. The switches board 1D is provided with a coin-lump insertion slot 2 receiving plural coins at a time and an image display device 3 comprising a liquid crystal display. The coin-lump insertion slot 2 may be replaced with a conventional coin-slot receiving coins one by one.

Figure 2:
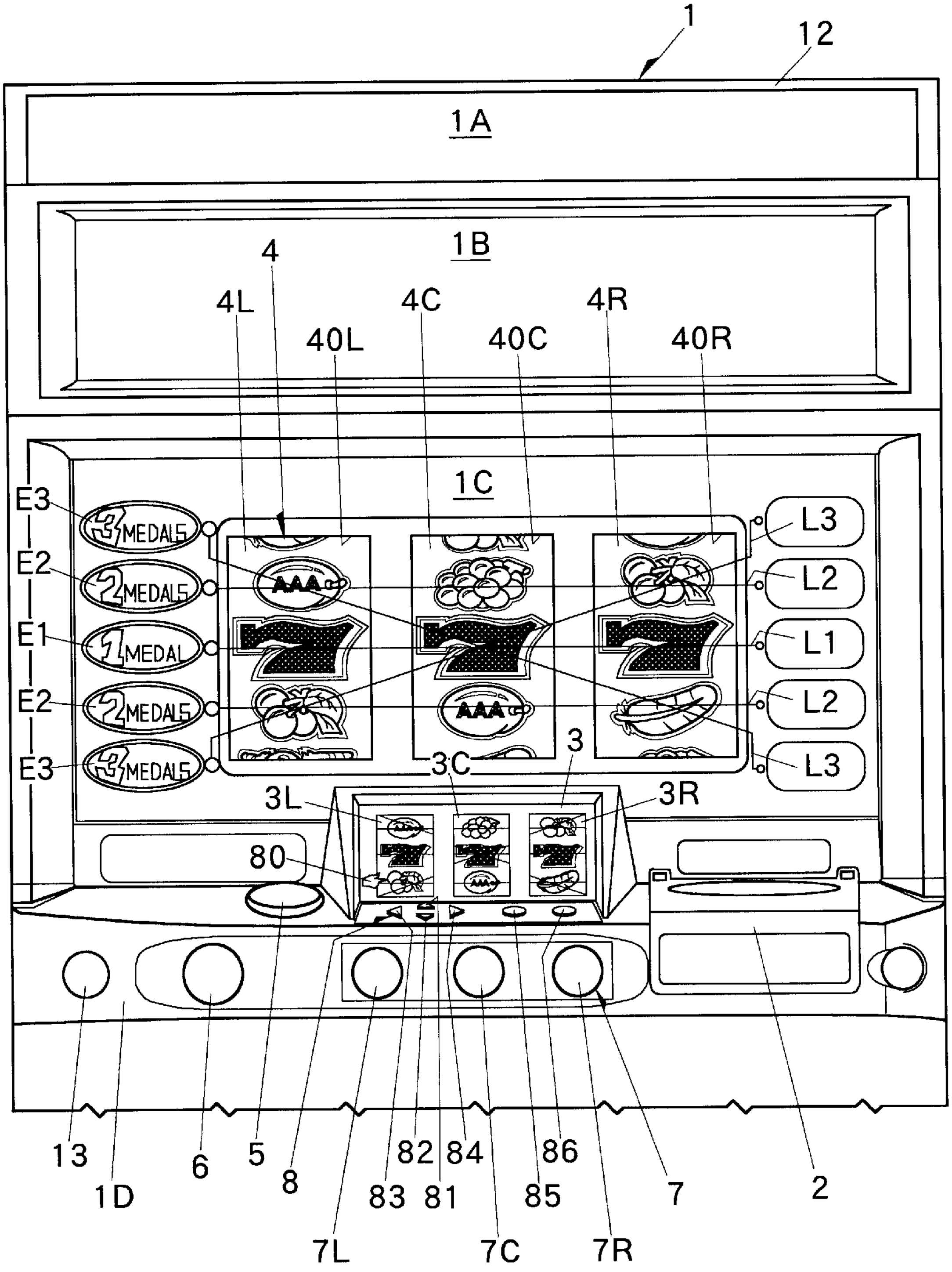
FIG. 2 is a front view of an upper part of the game machine.

As seen in FIG. 2, a changeably indicating means 4 comprising lefthand, middle and righthand wheels 4L, 4C and 4R each putting on their outer peripheries specific designs (or pictures) as "Red Seven", "Cherry", etc., is housed inside the wheels panel 1C. Upon stoppage of the wheels, three (upper, middle and lower) designs on each wheel can be clearly seen through indication windows 40L, 40C, and 40R.

The number of coins (tokens) to be bet for each specific single game is decided by use of a bet switch 5 which may be depressed once to bet three coins (which number is most frequent), twice for two and three times or more for one coin. Alternatively, the number of coins to be bet may be proportional to the times of depression of switch 5, or separate bet switches may be provided for each number (1, 2 or 3) of betting. Depending upon the number of coins to be bet, for example, one coin makes valid the single central winning line L1, two coins does so three lines including upper and lower ones L2, L2, and three coins five lines further including slanted lines L3, L3. Laterally provided indicator lamps E1 to E3 light correspondingly to valid winning lines. In Jack Game operation during the Regular and Big Bonuses, one coin betting is always selected irrespective of any depression times of the bet switch 5.

Start of each (single) game is actuated by tapping a freely swingable start lever 6 in a state that coin(s) have been bet. The three wheels 4L, 4C, 4R rotate simultaneously. Stop means 7 comprising lefthand, central and righthand stop buttons 7L, 7C, 7R are operated to stop separately the wheels 4L, 4C, 4R, so that specific combinations of the designs (put on the wheels) on the valid winning lines can decide winning or none on the basis of variation of which winning the number of coins to be paid are decided.

The image display device 3 shows on the screen three simulation wheels 3L, 3C, 3R which have the same designs as of the wheels 4L, 4C, 4R and rotate and stop simultaneously (synchronized) therewith. An operation switch 8 for setting (and for other operations) the aiming marker described later is formed in front of the image display device 3 and comprises an upper button 81, a lower button 82, a lefthand button 83, and a righthand button 84 for moving upwards, downwards, leftwards and rightwards a cursor 80 over the image display device 3, and further a decision button 85 and a cancel button 86.

In FIG. 2, reference numeral 13 designates a settlement switch which makes switching between a credit state wherein coins are previously memorized (with an upper limit of 50 coins) also for any following games and a settlement state wherein coins in credit are paid off to the return 1G.

Figure 3:
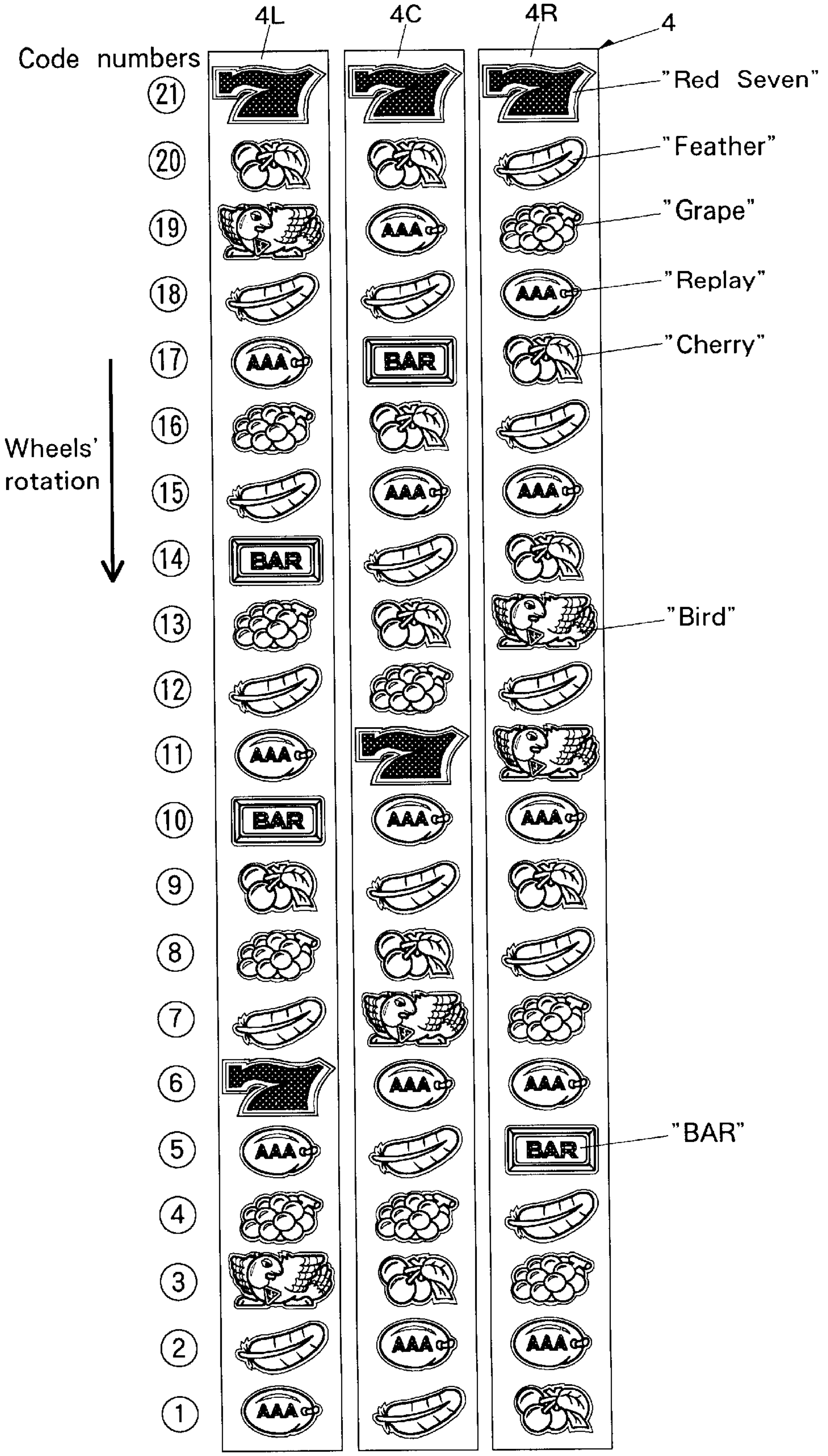
FIG. 3 is an expanded view of wheels of the game machine.

As shown in FIG. 3, the wheels 4L, 4C, 4R each have 21 designs put with code numbers 1 to 21. The designs in 7 kinds are "Red Seven", "Bird" and "BAR", those for Bonus operation, "Grape", "Feather" and "Cherry", those for Bit of Wins, and "Replay". The bands of the main wheels 4L, 4C, 4R are connected at the upper and lower ends with each other to make loop and rotate as indicated by the arrow.

As seen in FIG. 4, the winning styles or wins are Big Bonus, Regular Bonus, Bit of Wins, Replay and Jack Game winning. The design "Cherry" which makes winning even if aligned only on the lefthand wheel 4L enables 4 coins payoff when aligned on the upper or lower winning line upon 3 coins betting. This Pachislot machine is the so-called "A" type wherein in Big Bonus operation, particularly, during 30 times of usual games having a higher probability of winning the main Bit of Wins "Feather-Feather-Feather" in comparison with that in general games on other stages than Big Bonus, about 360 coins could be obtained through three sets of Regular Bonus which each may enable 8 times at maximum of 15 coins payoff in 12 Jack Games each starting with alignment of three Replays. The invention may be applicable to other types of machines such as B type with 2 sets of Regular Bonus in Big Bonus, B-CT type added (to B type) with a CT game, and C type including concentration of single Bonus winnings.

Figure 5:
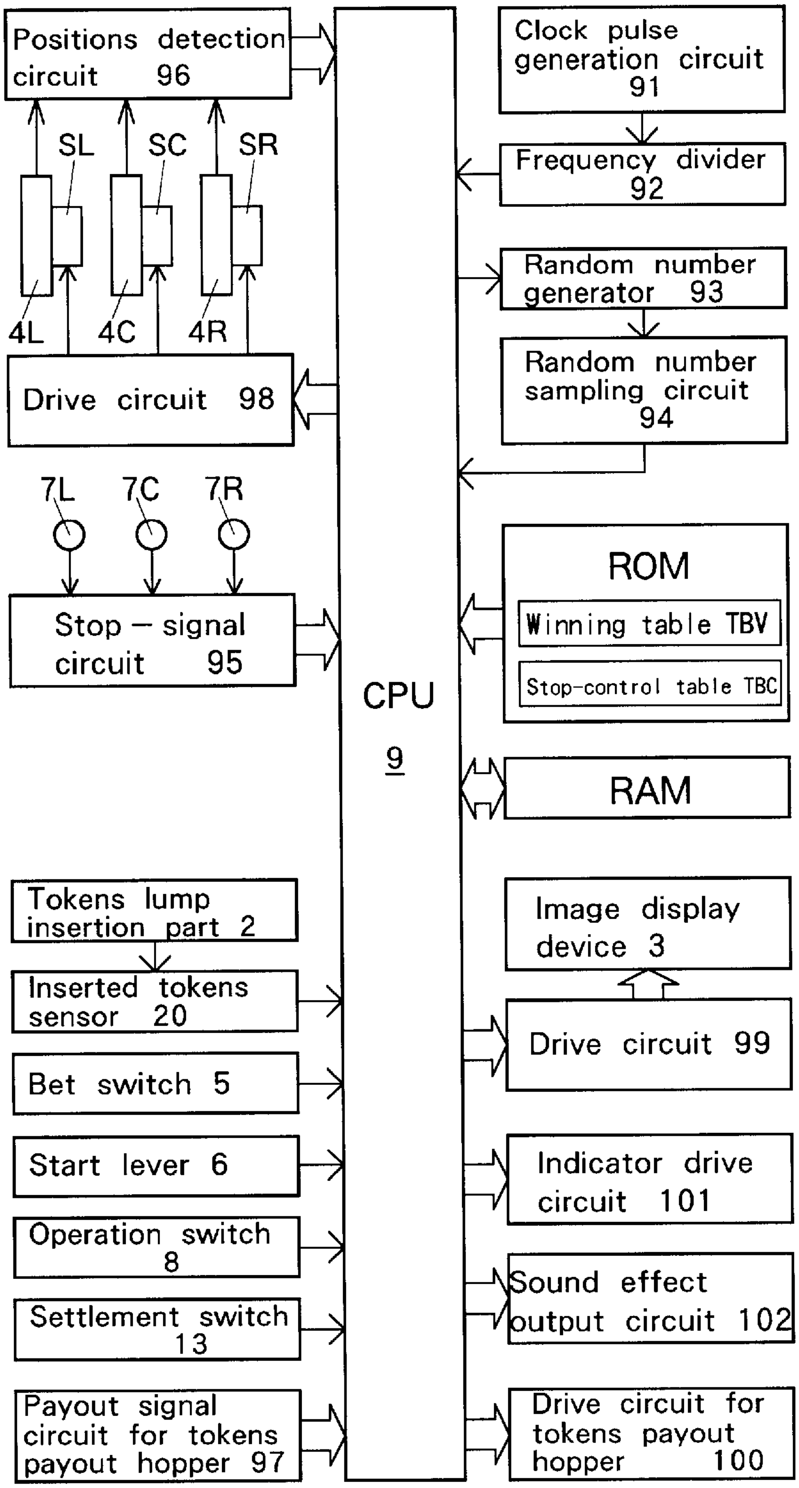
FIG. 5 is a block diagram of control of the same.

FIG. 5 is a block diagram of a controller controlling the whole of the game and having a main control unit 9 comprising a microcomputer CPU, read only memory ROM and random access memory RAM. 91 designates a clock pulse generation circuit, 92 a frequency divider, 93 a random number generator, and 94 a random number sampling circuit. On the basis of comparison and determination between random numbers taken at an instant when the start lever 6 tapped and winning table TBV memorized in ROM, presence or none of internal winning determination, and winning styles are decided. A Bonus-flag resulting from internal winning determination of Big Bonus or Regular Bonus can be carried over to following games, while results of internal winning determination regarding Bit of Wins and Replay are applicable only to the game concerned.

Connected to the input side of CPU are an inserted-coins sensor 20 detecting coins inserted through the coins-lump insertion slot 2, bet switch 5, start lever 6, operation switch 8 for the image display device 3, settlement switch 13, a stop-signal circuit 95 having, as input, stop buttons 7L, 7C, 7R, a position-detecting circuit 96 for wheels 4L, 4C, 4R, and a payoff signal circuit 97 for a housed coin-payoff hopper.

Connected to the output side of CPU are a drive circuit 98 for stepping motors SL, SC, SR directly connected to the wheels 4L, 4C, 4R, a drive circuit 99 for the image display device 3, a drive circuit 100 for the coin-payoff hopper, an indicator-drive circuit 101 for driving the game-state indicator 1A, lamps mounted behind the main wheels 4L, 4C, 4R, and so on, and a sound effect output circuit 102 connected to a speaker(or amplifier).

When the start lever 6 is tapped to cause the wheels 4L, 4C, 4R to start rotation and rotate at a predetermined constant speed, the stop buttons 7L, 7C, 7R are allowed to be operated depressed, so that on the basis of input to the stop signal circuit 95 and position-detecting circuit 96 and stop-control table TBC on the ROM, seven designs, i.e., specific three consecutive designs on each wheel (to be stopped in a shortest time-interval) plus four coming designs are checked out. Any design(s) if corresponds to a winning style or wins subjected to internal winning determination are caused to undergo a pull-into control enabling the designs to be aligned on a valid winning line(s), and a kick-away control preventing achievement of other winning styles not subjected to internal winning determination is carried out, stopping the wheels 4L, 4C, and 4R.

In case of a blank having no internal winning determination, the wheels 4L, 4C, 4R are stopped in a manner of acheiving no winning styles. Even in a game in which Bonus-flag is carried over, i.e., with Bonus having been internally determined, other than Bonus is subjected to internal winning determination. When Bit of Wins or Replay is internally determined, the result is taken precedence and subject to the pull-into control and kick-away control, stopping the wheels 4L, 4C, 4R.

Probability of internal winning determination of Big Bonus is 1/240 (setting No. 6) to 1/297 (setting No. 1), that of Regular Bonus 1/364 to 1/468. Synthetic probability of Big and Regular Bonus is lower as 1/240+1/364=about 1/145 (setting No. 6) to 1/297+1/468=1/182 (setting No. 1). Once subjected to internal winning determination, chances do not become void even if winning Bonus is not achieved in a flagged game. However, each wheel contains only few designs for Bonus, so that it is not easy for beginners poor in precisely aiming ability to cause the designs for Bonus to be combined even by use of assist with the four designs pull-into control.

The main control 9 monitors the cumulative total of games achieving no winning after Bonus-flagging as a latest game history, and actuates a support means useful for aligning designs for Bonus on the winning lines when the Bonus designs are not aligned on the winning lines to achieve no winning Bonus after a predetermined number of games from a first game in which Bonus is internally determined and the flag is achieved. This support means actuating aspect of main control 9 may be referred to as a "support allowing means" since it actuates (or deactuates) the support means based on a latest game history, in this case based on the history of whether the player has won any games lately.

A first embodiment of the support means in the state Bonus has been subjected to internal winning determination is to adjust the number of rotation of the wheels 4L, 4C, 4R. In detail, the stepping motors SL, SC, SR are controlled of speed via drive circuit 98, so that the wheels rotation number is stepwise lowered from usual high speed of 80 r.p.m. to middle speed of 70 r.p.m. in 15 games or more to 25 games or less after achievement of Bonus flag, and further to low speed of 60 r.p.m. in 26 games or more after the Bonus-flagging.

By this, specific designs put on the rotating wheels 4L, 4C, 4R can be readily seen to assist players in carrying out the precisely aiming operation. The more number of games players spend after achievement of the flag, the more the rotation number of wheels decrease. Beginners can be saved effectively. It is natural that advanced players are not given unequalness since coins are lost less in number when winning Bonus can be early achieved. Upon achieving Bonus winning, the wheels rotation number return to high speed. The number of games, that of rotation of wheels, and steps of shifting at or along which the wheels rotation is changed and lowered may be changeable or variable.

Simultaneously with lowering the rotation number of wheels 4L, 4C, 4R, the number of designs upon the pull-into operation may be changed, for example, changing to five designs (from four as ordinarily) at the usual high speed of 80 r.p.m., to four at middle spped of 70 r.p.m., and to three at low speed of 60 r.p.m. The more the rotation number is lowered, the more the number of designs subjected to pull-into operation decreases. Even when the designs can be easily seen at low speed to make easier the precisely aiming operation, an extent of assisting the pull-into operation is narrow. Hence, equality between beginners and advanced players can be further strictly kept. In place of stepwise lowering the wheels rotation number, the number of designs subjected to the pull-into operation may be increased with the wheels rotation number being fixed. In this case also, the Bonus designs can be easily aligned to serve as a support function for beginners.

Figure 6:
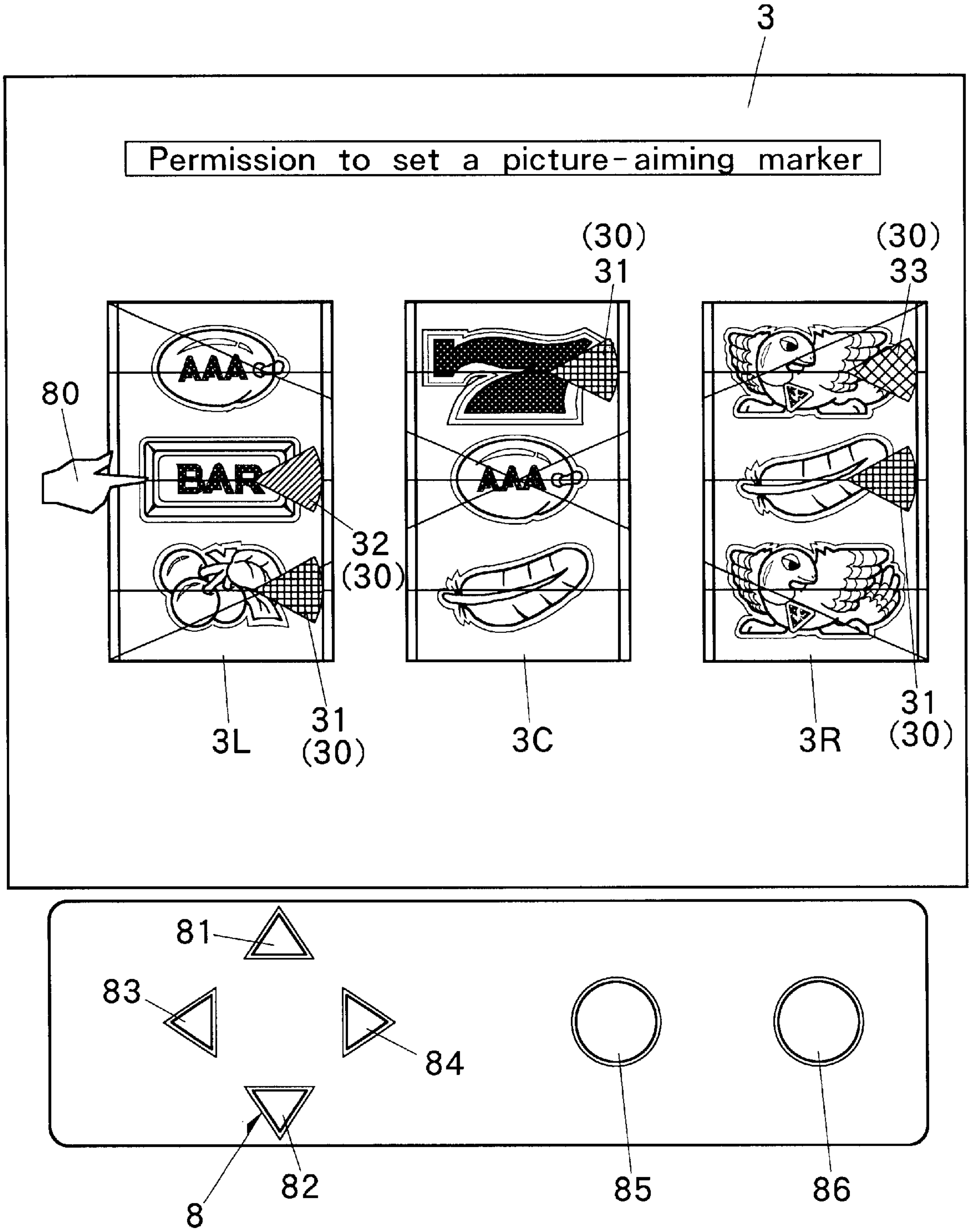
FIG. 6 is an explanatory view for allowing setting of an aiming marker among various support means.

As seen in FIG. 6, a second embodiment of the support means with Bonus having been subjected to internal winning determination is to allow setting of an aiming marker 30 over or on any desirable designs put in simulated wheels 3L, 3C, 3R. "Permission to set a picture (design)-aiming marker" is indicated on the image display device 3 in 15 games or more and 25 games or less after achievement of Bonus flag. The upper, lower, lefthand and righthand buttons 81, 82, 83, 84 may be used to move the cursor 80 over the lefthand, central and righthand lines and the upper, middle and lower winning lines. In case the cursor 80 is positioned on the upper or lower winning line and when the upper button 81 or lower button 82 is depressed, the simulated wheel of the concerned line scrolls downwards or upwards and a hidden design appears. The decision button 85 is depressed to put a marker 30 laterally righthand of the design correspondingly to the cursor 80. The marker 30 moves together with the design on which the marker is provided.

The markers 30 may be provided in a manner of one for each vertical line, or three or less (colored in red, blue or green) for each vertical line. A marker first provided on each vertical line may be a red marker 31, a second one a blue marker 32 and a third one a green marker 33 in the order. Cancel button 86 when depressed cancels all the markers 30. Since operating efficiency of the game lowers after spending 25 games, the markers are then not allowed to be set. Such limitation may be not provided. In any case, a marker 30 finally put remains until Bonus winning is achieved.

The start lever 6 is tapped to cause the simulation wheels 3L, 3C, 3R to have or indicate thereon the same designs as of the wheels 4L, 4C, 4R and be synchronized therewith in rotation. Accordingly, thanks to the marker 30 put on the simulation wheels 3L, 3C, 3R, the aiming operation is complemented to save or assist beginners. Advanced players who can early obtain Bonus winning without using the markers would not be given unequalness particularly by the marker adding function. Any of beginners may dispense with the markers. It is in players discretion to use or not use the markers under the state the marker setting is allowed. The specific conditions such as the number of games at which setting the marker 30 is allowed may be changeable or variable.

Markers 30 may be uniformly automatically put on at least one of "Red Seven" among the Bonus designs on each vertical line, or also put (in different colors) on a second "Red Seven" or "BAR", other than the foregoing feature of players freely setting on desired designs. Alternatively, as markers 30, marker lamps may be fit to the main wheels 4L, 4C, 4R to light, or lamps mounted behind the wheels may be used to be lit when or at the instant that "Red Seven" and others pass the indication windows 40L, 40C, 40R.

In addition to the visual markers, there may be provided a sound like a metronome generated at an instant that at least one of Bonus designs, "Red Seven", passes the indication windows 40L, 40C, 40R, or a vibration at the stop buttons 7L, 7C, 7R, start lever 6, or a part of front door 12. In case that sound generation or vibration is applied once per rotation for one "Red Seven", rhythm interval is 0.75 sec at 80 r.p.m. of the wheels. And rhythm interval 1.5 sec. in case of once per two rotations, and 3 sec. in case of once per four rotations.

Figure 7:
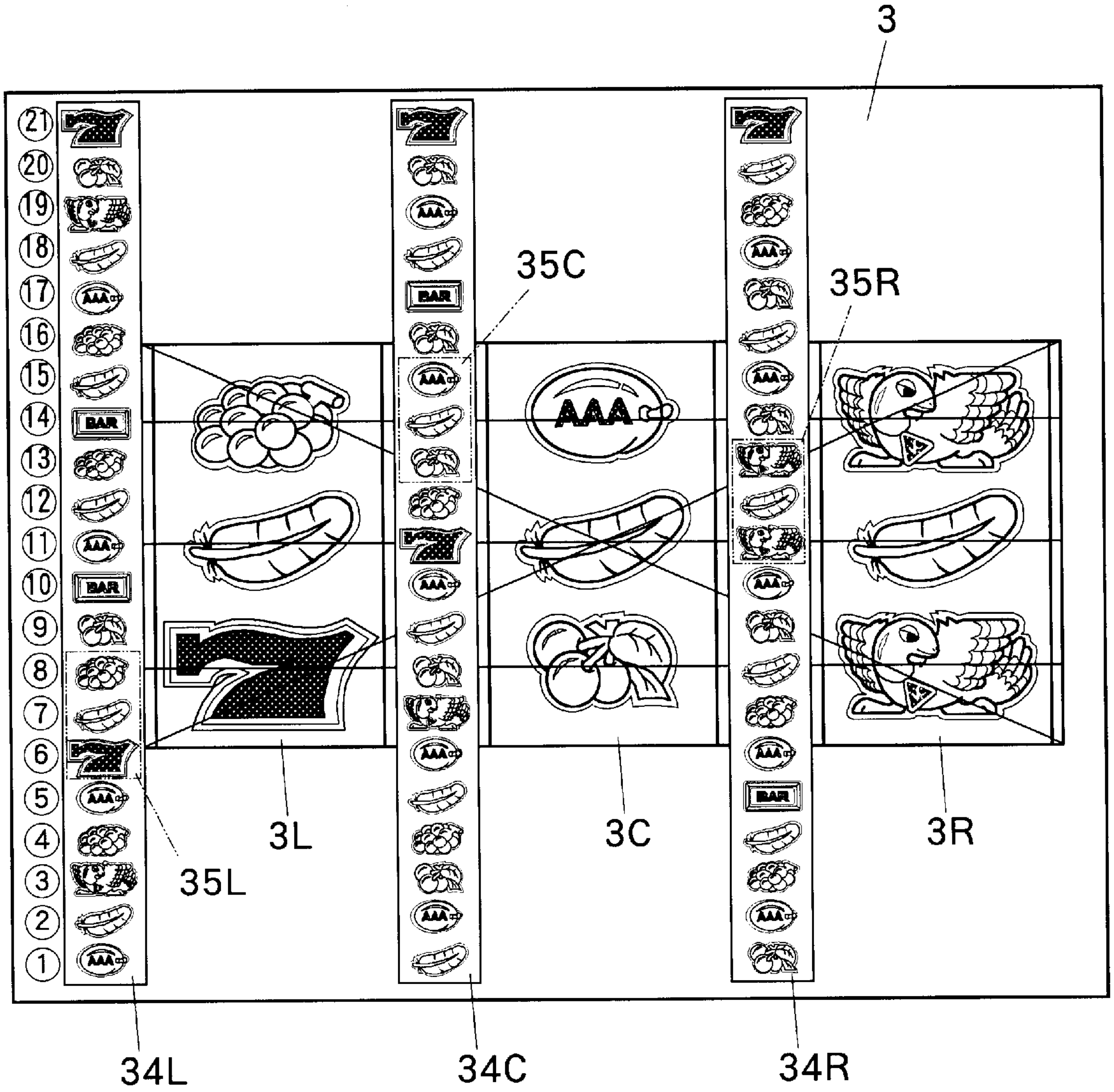
FIG. 7 is an explanatory view for indication of wheels bands among various support means.

As seen in FIG. 7, a third embodiment of the support means usable during the game undergoing the Bonus internally determined may be wheels bands 34L, 34C, 34R having arrangement of 21 designs and indicated statically at the lefthand side of simulation wheels 3L, 3C, 3R at the time after 10 games or more and 30 games or less from the achievement of Bonus flag. Further, at the time after 31 games or more from the achievement of Bonus flag, three indication windows designs 35L, 35C, 35R passing the indication windows 40L, 40C, 40R maybe scrolled upwards, synchronized with the wheels 4L, 4C, 4R, in the static wheel bands 34L, 34C, 34R. The scrolled indication windows designs 35L, 35C, 35R may be made noticeable by changing tones of the designs themselves or a background around the designs, or may be distinguished from others by use of framing or lines.

The static wheels bands 34L, 34C, 34R are indicated to show specific arrangement of the designs, so that the aiming operation is made easy. Unless Bonus winning is acheived by use of the feature, movement of three indication windows designs 35L, 35C, 35R, synchronized with the wheels 4L, 4C, 4R, in the static wheels bands 34L, 34C, 34R may be used for the aiming operation. This is warm and kind supports provided stepwise in the order to effectively save or assist beginners, while it does not form a particular unequalness to advance players who can early obtain Bonus winning. The conditions of the number of games when indication of the wheels bands and other features are provided may be changeable or variable.

Figure 8:
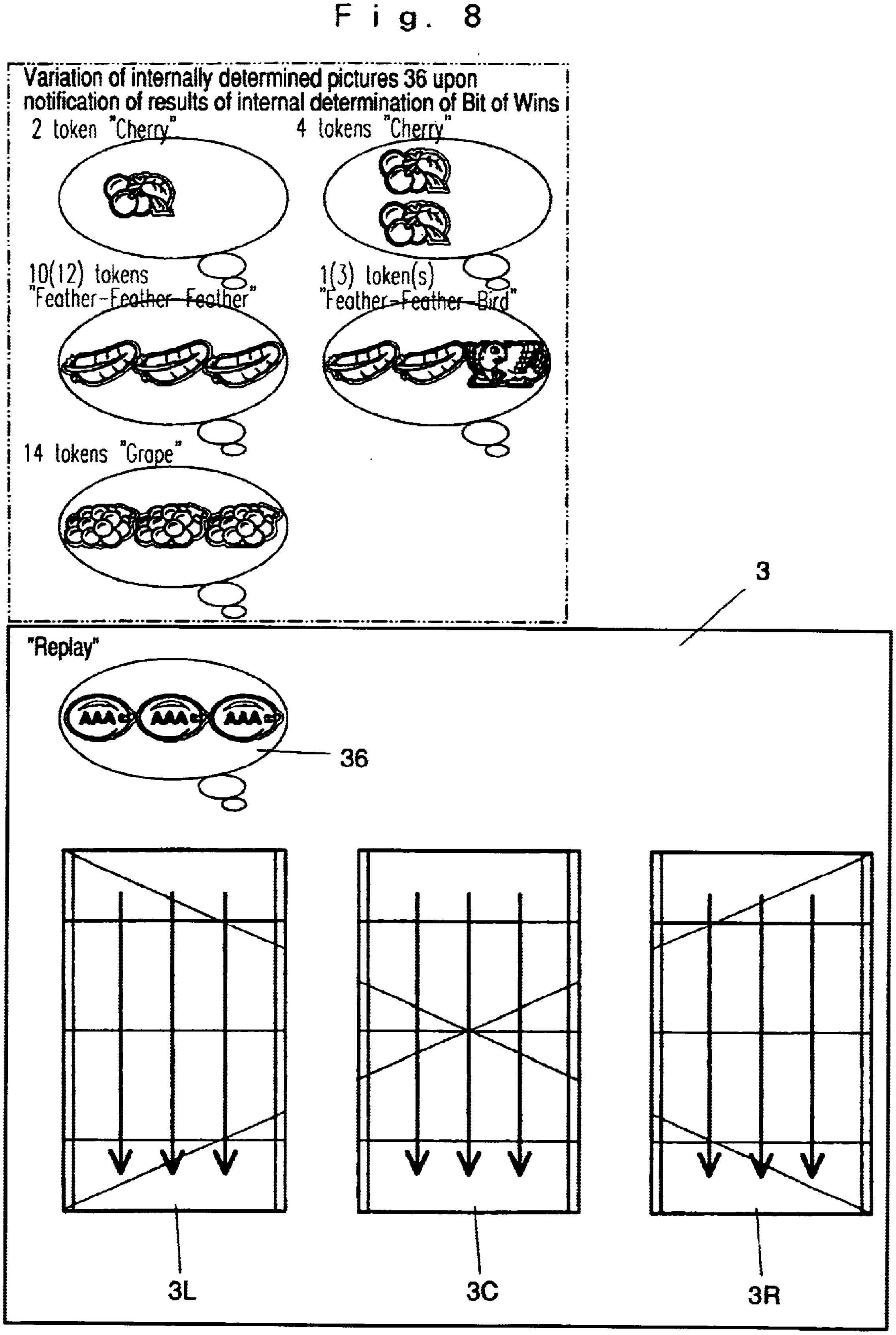
FIG. 8 is an explanatory view for informing results of internal determination among various support means.

As seen in FIG. 8, a fourth embodiment of support means during the game undergoes Bonus internally determined is the informing of the achieved flag, i.e., the results of internal winning determination. It is generally required to grasp that stopped or aligned designs on the wheels 4L, 4C, 4R do or do not form an arrangement being about to become winning, or to foresee it from an informing feature performed by lamps behind the wheels, or the like, in order to understand whether the game undergoes or does not undergo Bonus internaly determined. It is difficult for beginners to do such consideration. To distinguish Big Bonus from Regular Bonus is also hard, and it would be unclear which one should be aligned between Red Seven or BAR. Hence, after 5 games or more and 15 games or less from achievement of Bonus flag, results of internal winning determination of Bit of Wins are informed. And after 16 games or more from achievement of Bonus flag, results of internal winning determination regarding all winning styles including Bonus are informed in such manner that the start lever 6 is tapped to cause designs 36 subjected to internal winning determination are shown on the design indication device 3.

After 5 games from internal winning determination regarding Bonus, an internal winning determination result of Bit of Wins is first informed in which game stopping operation can be made to aim at Bit of Wins precedently featured or pulled into, thereby reducing failure in winning such winning style. Besides, provision of the informing enables players to perceive or guess the internal winning determination regarding Bonus, and allows them to concentrate upon aiming at "Red Seven" or "BAR" in a next game in which if there would be no informing of internal winning determination of Bit of Wins. Furthermore, after 16 games or more, results of internal winning determination regarding all winning styles are informed to enable players to perceive the game being engaged in Big or Regular Bonus and concentrate upon aiming, for example, at "Red Seven" in case of Big Bonus.

Accordingly, beginner players can limit designs to be aimed at in the order without useless and reckless stopping operation, whereby being effectively supported. Advanced players, who can early obtain Bonus winning by early perceiving internal determination of Bonus from those aligned designs being about to become winning, or the like, are not subjected to particular unequalness by this feature. When Bonus winning is obtained, informing the internal winning determination results ends. The number of games at which the informing starts or the content to be informed is changed may be changeable or variable. Further, the first informing of internal winning determination regarding Bit of Wins or the second one regarding all winning styles may include or not include Replay. The second informing regarding all winning styles may include or not include distinction between Big or Regular Bonus.

Figure 9:
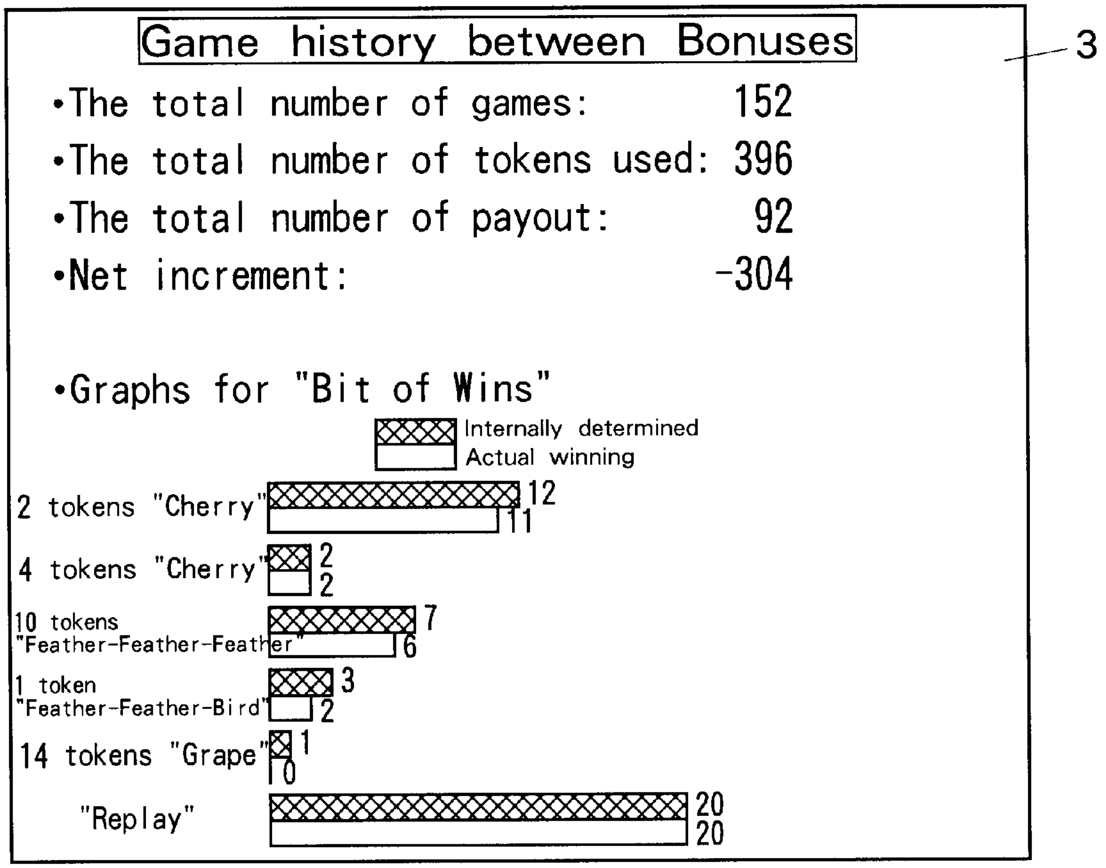
FIG. 9 is an explanatory view for indication of games results upon winning Bonus among various support means.

As shown in FIG. 9, an embodiment of support means upon Bonus winning, i.e., at the time when the Bonus designs are aligned on the winning lines reaching Bonus winning may be allowing indication of a game history useful for estimation of the game. In detail, simultaneously with achievement of Bonus winning, the game history from the end of a preceding Bonus game, i.e., a game history between Bonuses, is automatically shown on the image display device 3.

Items shown are the total number of games until Bonus winning, total numbers of coins used and paid during the games, net increment corresponding to difference therebetween, and graphs showing obtaining Bit of Wins winning. It is preferable to provide an initial reset switch, which operated upon start of game, for accurately indicating a game history regarding a single player from start of game to an initial winning of Bonus. It may be in the form of an exclusive button switch or a cursor selection item on the image display device 3. The game history may be shown on a single scene or a plurality of changeable scenes.

After winning Bonus, when a game is startedf, the image display device 3 returns to the scene of simulation wheels. A game, in case of Big Bonus, starts not with the one-coin betting Jack Game but with usual games on three-coins betting basis and with Bit of Wins being obtainable, not like the case of a single Regular Bonus. During the usual games in the Big Bonus, the game enters Regular Bonus correspondingly to three Replays alignment, starting Jack Game. Internal probability for entering Regular Bonus may be high, for example, 1/4.267. That of three "Feathers" alignment, the main Bit of Wins, is made noticeably higher as 1/2.215 with respect to 1/11.394 for usual games, and "Feather-Feather-Bird" 1/4.091 with respect to the maximum 1/19.27 for usual games. Larger payoff may be provided. Big Bonus ends when three sets of Regular Bonus or 30 times of usual games complete.

During Big Bonus, on the image display device 3, similarly to FIG. 7, wheels bands 34L, 34C, 34R and indication windows designs 35L, 35C, 35R are indicated together with the simulation wheels 3L, 3C, 3R. In usual games after a first set of Regular Bonus ends, when "Replay" allowing to enter again the Regular Bonus is internally determined, corresponding designs 36 (see FIG. 8) are also shown on the image display. Further, in usual games after a second set of Regular Bonus ends, internally determined designs 36 subjected to "Replay" and all of Bit of Winds are also shown on the image display. This support means is applied uniformly to beginners and advanced players.

In addition to or in place of the uniformly applied support, such feature may be provided that actuation, by the support allowing means, of a support means useful for increasing benefit to be obtained is only allowed when provided benefits are few during Big Bonus. A first example of support means actuated in this manner the lowering of rotation number of wheels 4L, 4C, 4R similarly to the foregoing first embodiment of support means usable in Bonus having been internally determined. In detail, the rotation number is set to high speed of 80 r.p.m., as usual in case of net increment of 221 or more upon ending of a second set of Regular Bonus, to middle speed of 70 r.p.m. with net increment 191 or more and 220 or less, and to low speed of 60 r.p.m. with net increment of 190 or less.

Big Bonus starts, a first three coins betting usual game has three "Replay" alignment, eight consecutive times of one-coin betting Jack Games receive 15 coins in each game, followed by ending of a first set of Regular Bonus. Then, a second three-coin betting usual game had three "Replay" alignment, and similarly, eight consecutive times of one-coin betting Jack Games receive 15 coins in each game, ending a second set of Regular Bonus. In such most rational case, coins payoff is 15×8×2=240, coins used (3+1×8)×2=22, net increment 240−22=218.

Net increment 221 or more means that Bit of Wins are also obtained effectively in the midst usual games. Net increment 190 or less means many blanks in the midst usual games or any causes making unable to fully spend a predetermined times of Jack Games. In case of 191 or more and 220 or less, it is assumed that Bit of Wins are not obtained effectively in comparison with the case of net increment 221 or more.

In case that a usual game in Big Bonus operation has an internal winning determination regarding "Replay" to enter Regular Bonus, the aiming operation is carried out to intentionally avoid the three "Replay" alignment by use of Replay avoiding technique, and a next game is caused to have three "Feathers" alignment, the main Bit of Wins. Coins used are 3×2 games=6, payoff 12, then net increment 6 is added.

In case that net increment is little upon end of a second set of Regular Bonus, the wheels rotation number is lowered from high speed to middle, or to low, so that it makes easier to perform the Replay avoiding technique or the aiming for obtaining Bit of Wins, thereby facilitating increase of coins to be obtained in the remaining games. The time when the wheels rotation number is to be lowered and the conditions for net increment may be changeable or variable.

As seen in FIG. 10, a second example of support means in usual games during Big Bonus may be the showing of procedure of Replay-avoiding which is an effective operation in Big Bonus. When an eleventh game is started, after 10 or more usual games in Big Bonus with net increment being zero or less before entering a first Regular Bonus, Procedure for avoiding "Replay" is indicated on the image display device 3, and there appears an indication (1) that reverse pushing (stop buttons are depressed in the order as righthand, central and lefthand) is used, and the group of "Bird", "Feather" and "Bird" is aimed at (FIG. 10(A)).

Righthand stop button 7R is operated to stop righthand wheel 4R. There appears (2) Do pushing the stop button at random or in an unintentional timing for the central wheel (FIG. 10(B)). It is because "Replay" and "Feather" are ensured, in relation to the arrangement of designs, to be about 100% pulled into (the indication windows). Pushing the stop button at random or in an unintentional timing is the exact oppite of the precisely aiming technique. The central button 7C is operated to stop the central wheel 4C, and there appears that pushing may be varied for the lefthand wheel corrspondingly to the specific winning styles. And patterns being about to become winning and designs to be aimed are shown (FIG. 10(C)). The feature shown in this example can be carried out easily for avoiding "Replay" with the upper winning line because of an enough number of designs.

When three "Replay" alignment is not achieved due to the avoiding technique in case that "Replay" has been internally determined, there appears an indication of "success in avoiding "Replay" " (FIG. 10(D)). Also, when the Replay avoiding technique is carried out, in case that actually "Replay" has not been internally determined while "Feather-Feather-Feather" or "Feather-Feather-Bird", the Bit of Wins, is internally determined, such Bit of Wins may be automatically achieved (FIG. 10(E)).

The condition for showing the Replay avoiding procedure is 10 or more usual games before entering a first Regular Bonus, and net increment zero or less. This is because of assumption of such case that Replay avoiding has been performed to some extent but coins increment is not seen due to poor operation and is foreseen to largely lower in comparison with the time not performing the Replay avoiding. Correcting misunderstanding and teaching an effective procedure could prevent players from losing benefit to be inherently enjoyed by them. The specific conditions that the procedure is shown may be changeable or variable. Explanation of the avoiding procedure in lump may be shown other than the navigation style of dialogue in association with stopping the stop buttons.

A third example of support means in usual games during Big Bonus may be to allow setting of aiming maker 30 at desired designs of simulation wheels 3L, 3C, 3R similarly to those explained in the second embodiment of support means with Bonus internally determined, i.e., FIG. 6. For example, when no Regular Bonus has been spent in the state less than 10 usual games during Big Bonus, the setting of aiming marker is allowed by the support allowing means in the eleventh game and those thereafter.

In this case, players focus on obtaining Replay avoiding and obtaining Bit of Wins, but not spend a predetermined sets of Regular Bonus to have a high possibility of self-destruction. Players tending to get engrossed in Replay avoiding often fall into such circumstances to obtain only less number of coins. The aiming marker 30 is, as similarly to normal pushng DDT technique enabling avoiding three "Replay" alignment and failure in winning all Bit of Wins, set for examle at "BAR", code number 10, on the lefthand wheel. By this, maximum recovery can be facilitated in the remaining games with the aiming capacity being assisted, thereby enabling benefit to be inherently obtained to be reduced as less as possible. The conditions of the number of games, etc., with which the marker 30 is allowed of setting may be changeable and variable.

Figure 11A:
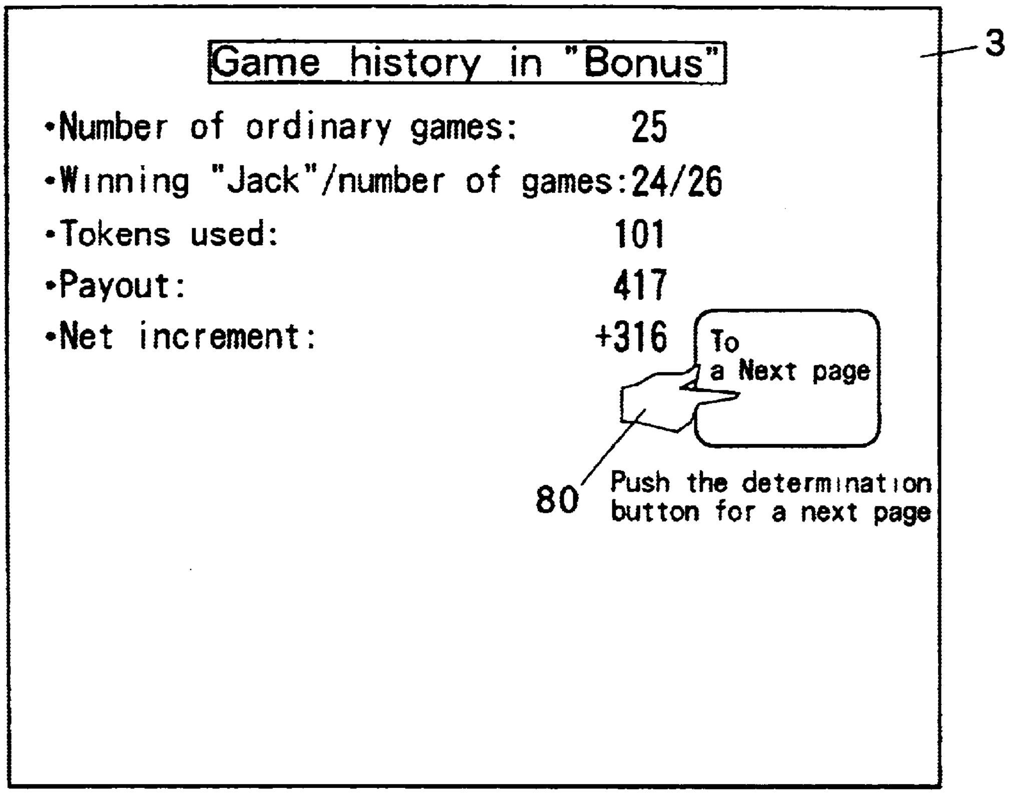
FIG. 11 is an explanatory view for indication of games results upon end of Bonus among various support means.
Figure 11B:
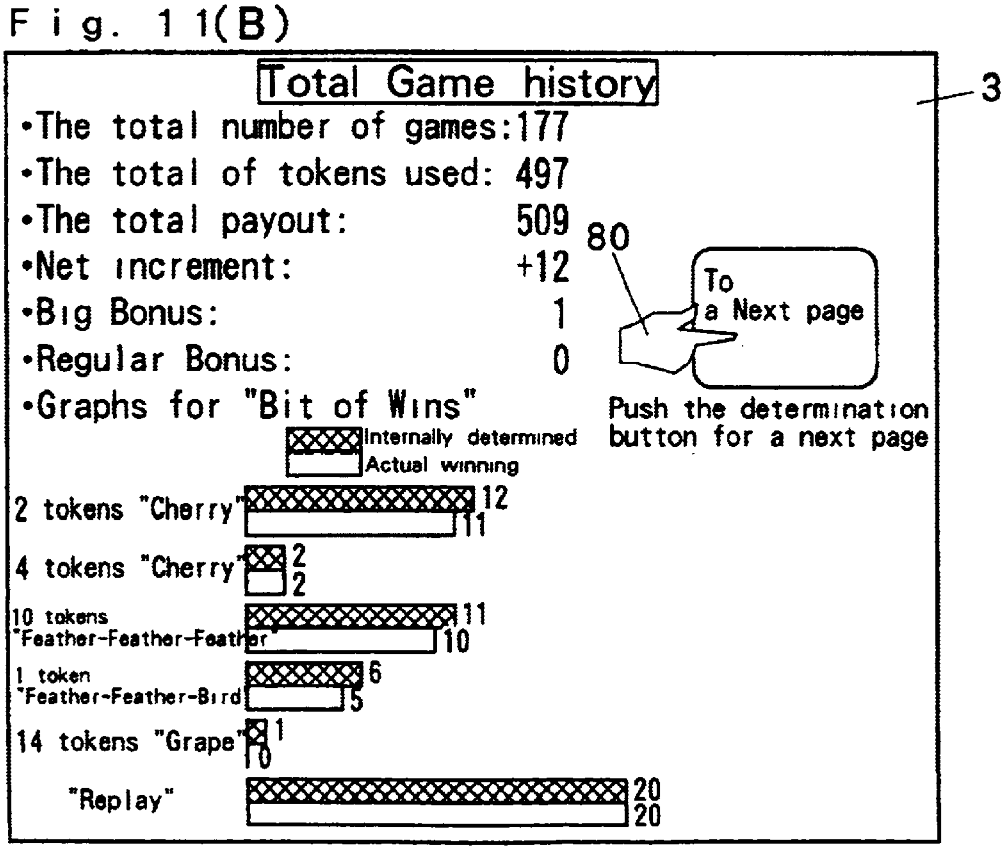

As seen in FIG. 11, an example of support means usable upon end of Big Bonus may be the allowing indication of game history useful for estimation of games. In detail, simultaneously with end of Big Bonus, a game history (A) during Big Bonus and a total game history (B) are shown on the image display device 3 by changing the scenes.

Items to be shown in the game history during Big Bonus are numbers of ordinary games, winning Jack Games and number of games, coins used, payoff and net increment. Those shown in the total game history are total number of games, total of coins used, total payoff, net increment, Big Bonuses, single Regular Bonuses (except those in Big Bonus) and graphs of winning Bit of Wins.

After Big Bonus ending, players play again usual or ordinary games, expecting to win Bonus again. To win Bonus, it is preliminarily required to cause Bonus to be subjected to internal winning determination by drawing lots regarding random numbers on the basis of specific random numbers taken by tappping the start lever 6, which is controlled by accidental occurence. Hence, there may happen a series of consecutive chances in a short time leading to Big Bonus, or unfortunately happening no occurence of Bonus determination for a long time. The feature is particularly effective in such unfortunate situation to make failure in winning Bit of Wins as little as possible. It is advantageous to prevent reduction of the number of coins to be obtained while causing players to expect having Bonus again.

A support means useful for aligning any winning designs (in relation to the internal winning determination) on the winning lines is allowed of its actuation when Bonus is not achieved again after a predetermined number of games from end of a preceding Bonus. A first example of this support means in ordinary games does not provide a support until 300 games after ending of Bonus, but causes internally determined designs 36 to be shown on the image display device 3, similarly to FIG. 8, when the games are 301 or more and 600 or less, and two coins "Cherry" and four coins "Cherry" are internally determined, and also when the games are 601 or more with 10 coins "Feather-Feather-Feather" and one coin "Feather-Feather-Bird" being internally determined.

Probabiility that the number of games wherein Bonus is not achieved again without Bonus-flag after end of a preceding Bonus becomes 301 is (1−1/182)301=(181/182) 301=about 19 (%) (:the exponents) since synthetic probability of Big and Regular bonuses at setting 1 is 1/182. And that for 601 games is (181/182) 601=ab. 3.6(%).

As shown in FIG. 8, from and after 301th game, an internally determined design 36 of a single "Cherry" is indicated when two coins "Cherry" has been internally determined, and two "Cherries" designs 36 are shown when four coins "Cherry" has been internally determined. Hence, it is understood that the "Cherries" with code numbers 9 and 20 disposed at an interval of an angle 180 degrees on the lefthand wheel 4L are to be stopped in the frame of indication window 40L within a range of an accepted pulled-into designs. By contrary, when the "Cherry" at No. 9 or 20 is stopped in a dead timing at a time as passing the lower winning line and moving ahead along a few designs, a coming another Cherry displaced about 180 degrees (i.e., No. 20 positioned at an eleventh design point from a preceding No. 9, and a coming No. 9 positioned at tenth design point from that No. 20) will not be able to be drawn or pulled into to the winning point, which stopping operation in that timing should be avoided.

From and after 601th game, in addition to the internal winning determination design 36 of the two or four coins Cherry, those 36 of 10 coins three Feathers feature is shown as in FIG. 8, when the same feature has been internally determined, and one coin two Feathers with Bird feature when internally determined. In case of the ten coin designs 36 are shown, many Feathers dispersed on each wheel may be aligned on the winning line by use of the drawing or pull-into assist with the pushing buttons at random for all the wheels. And in case of one coin internal winning determination design 36, the group of Bird, Feather and Bird (code Nos. 11, 12 13) are to be aimed at.

This enables beginners to make less failure in winning Bit of Wins while allowing advanced players (who are able to carry out DDT method) to be mitigated in performing strictly the aiming operation. The conditions of number of games at which the internally determined design 36 is shown, and Bit of Wins subjected to indication of internally determined designs, may be changeable or variable.

In detail, for example, when the games are 601 or more, and 14 coins "Grape-Grape-Grape" has been internally determined, its design 36 may be also indicated in addition to the 10 coins and one coin designs Further, when the game is for example 901st or more over the 601 times, with 14 coins Grapes being internally determined, its design 36 may be indicated. Moreover, at any free number of games, for example, 501 or more, an internally determined designs 36 for all Bit of Wins may be shown.

In the above feature, under such condition occuring at a predetermined probability in the games that specific flags of Big or Regular Bonus is not achieved during a predetermined number of games, the result of internal winning determination of a specific winning style, the Bit of Wins, is informed by indication of the design 36. Conditions for informing the internal determination results for specific winning styles may be changeable or variable. For example, as seen in Japanese Patent No. 1855980 (Application No. 63-65543, Publication No. Hei-5-74391, Patentee being the present Applicant), by taking as an opportunity the achievement of a specific flag such as a large hit flag or a Bonus flag, specific winning styles may be informed of their results of internal winning determination.

The patent No. 1855980 teaches a slot machine provided with a control device for controlling to stop a plurality of wheels showing specific designs in indication windows correspondingly to random numbers, the control device being brought into halt of the stopping operation corresponding to random numbers during a predetermined number of games when specific conditions are met in the game. To a conventional slot machine wherein equality is attached great importance and only winning styles internally determined by drawing of lots with respect to random numbers are achieved within a drawing range of 4 design points, a technical interactivity with which advanced player can obtain results corresponding their skill is applied, under achievement of specific conditions in the games on the basis of forming the great hit flag, without the conventional operating method allowing achievement of winning styles in a limited number of games, which feature is decisive in basic specification of the existing challenge-time machine.

In any case, by taking as opportunity the fact that Big or Regular Bonus flag is not achieved during a predetermined number of games, or achievement of specific flag such as great hit flag of Patent 1855980, when specific conditions occurring in the game at a predetermined probability are met or achieved, the results of internal winning determination for specific winning styles are informed to players, so that they understand it is required to make stopping operation aiming at what designs. Hence, failure in winning any wins internally determined can be reduced to prevent coins to decrease in number, while enabling players to have the Bonus internally determined, thereby providing proper supports to beginners and advanced players as well.

In the above feature, the internally determined design 36 of the specific winning styles such as two coin Cherry and four coins Cherry are indicated in a predetermined number of games such as 301 or more and 600 or less wherein Bonus is not achieved again. Even in the midst of a predetermined number of games, when Bonus is achieved again and players obtain favourable circumstance, the support with indication of the internally determined design 36 is stopped. Hence, this does not mean an excessive support to players, and disadvantage, even if any in the game parlours, does not make problem.

A second example of support means usable in ordinary game may be indication of wheels bands 34L, 34C, 34R similar to FIG. 7 when the number of games after end of Bonus becomes 500 or more. Indication windows designs 35L, 35C, 35R are not scrolled. By this feature, the arrangement of designs can be clearly seen to enable players to reduce failure of winning Bit of Wins. The conditions such as the number of games may be changeagle or variable. The indication windows designs 35L, 35C, 35R may be scrolled in indication.

As seen in FIG. 12, the support means as foregoing are as seen in the table. The supporting items may be used solely or in combination freely, for example, a combination of wheels bands, informing of internal winning determination results, showing of operational procedure, and indication of game results as shown in the flow chart of FIG. 13.

Figure 13:
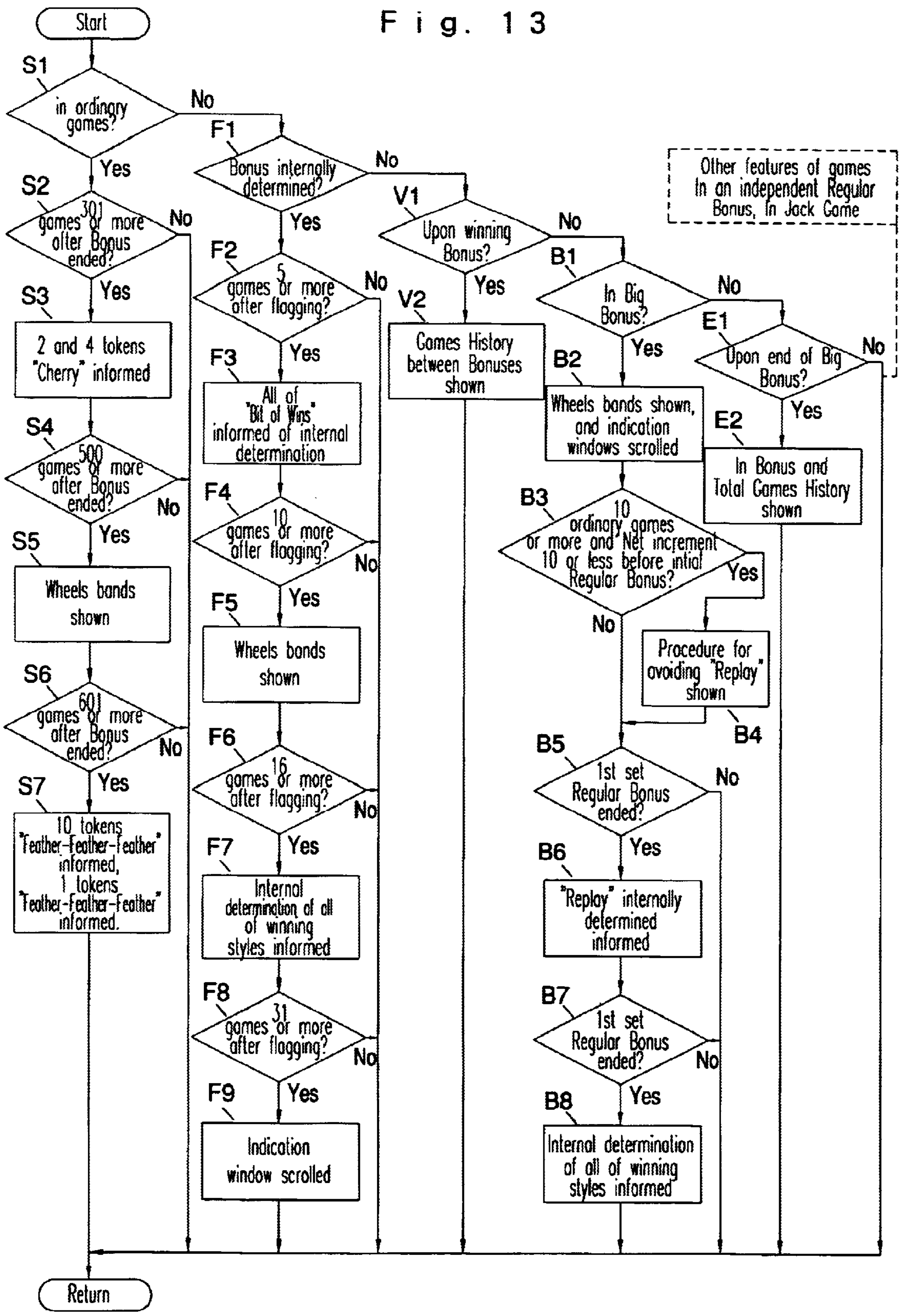
FIG. 13 is a flow chart showing examples of combination of support means.

As seen in FIG. 13, the game feature is a general game (S1), the number of games after the end of a preceding Bonus being 301 or more (S2), and two or four coins Cherry being internally determined, then, a corresponding internally determined design is informed (S3), the number of game being more than 500 (S4), then wheels bands being indicated (S5), and the number of games being 601 or more (S6), then, an internally determined design of 10 coins Feather-Feather-Feather, and one coin Feather-Feather-Bird being informed (S7).

The game feature has Bonus internally determined (F1), the number of games being 5 or more after Bonus-lagging (F2), then, internally determined designs for all of Bit of Wins being informed (F3), the number of games being 10 or more (F4), wheels bands being indicated (F5), the number of games being 16 or more (F6), internally determined designs for all of winning styles being informed (F7), and the number of games being 31 or more (F8), indication windows designs being scrolled (F9).

When the game feature has Bonus being won (V1), a game history between Bonuses is indicated (V2). When the game feature is in Big Bonus (B1), the wheels bands are shown (B2), the ordinary games being more than 10 before a first Regular Bonus and net increment being zero or less (B3), the Replay avoiding procedure being shown (B4), a first set of Regular Bonus ending (B5), internally determined designs for Replay being informed (B6), a second set of Regular Bonus ending (B7), internally determined designs for all of winning styles being formed (B8). The game feature is after end of Big Bonus (E1), the game history during Bonus operaiton and a total game history are shown (E2).

Figure 14:
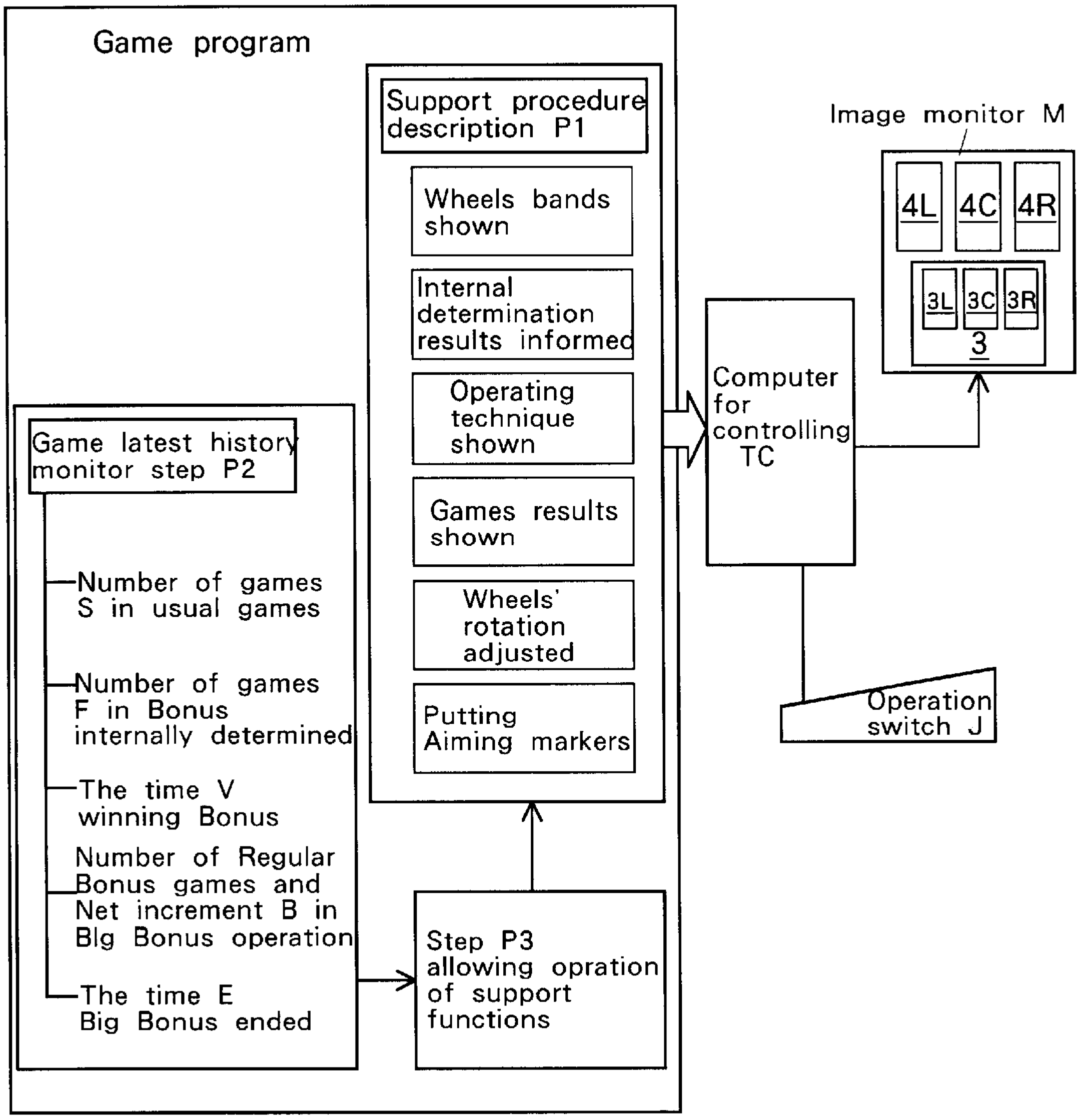
FIG. 14 is a structural diagram of the game program.

FIG. 14 shows a structure of program for a simulation game memorized in a medium readable by a computer such as a compact disc or ROM cartridge. The medium is provided with a support function disposing procedure description P1, which describes regarding wheels bands internal winning determination results, operational procedure showing, game history indication, wheels rotation number reduction and aiming maker setting, each useful for favouring players, the medium further comprising a game assist method including a monitor step P2, which monitors the number S of games in a latest game history going back from a latest time, the number of games F with Bonus being internally determined, time V of winning Bonus, the number of spent Regular Bonus during Big Bonus and net increment B and time when Big Bonus ends, and an allowing step for allowing actuation of the support means on the basis of the monitored latest game history.

Through a control computer TC such as a television game controller or a personal computer, the main wheels 4L, 4C, 4R and simulation wheels 3L, 3C, 3R on the image display device 3 are shown on an image monitor M such as a household television or a display of a personal computer. The start lever, stop buttons etc., may employ an operating part accompanied with the television game controller or an operation switch J such as keyboard of a personal computer. The support functions may use the items shown in FIG. 12 separately , or in combination as in FIG. 13.

FIGS. 15 to 24 show a second embodiment of a game machine wherein technical levels of players are estimated in view of failures in winning the winning styles in ordinary game other than Big Bonus, any players having much failure in winning are given kind and careful support to save their disadvantage to some extent.

Figure 15:
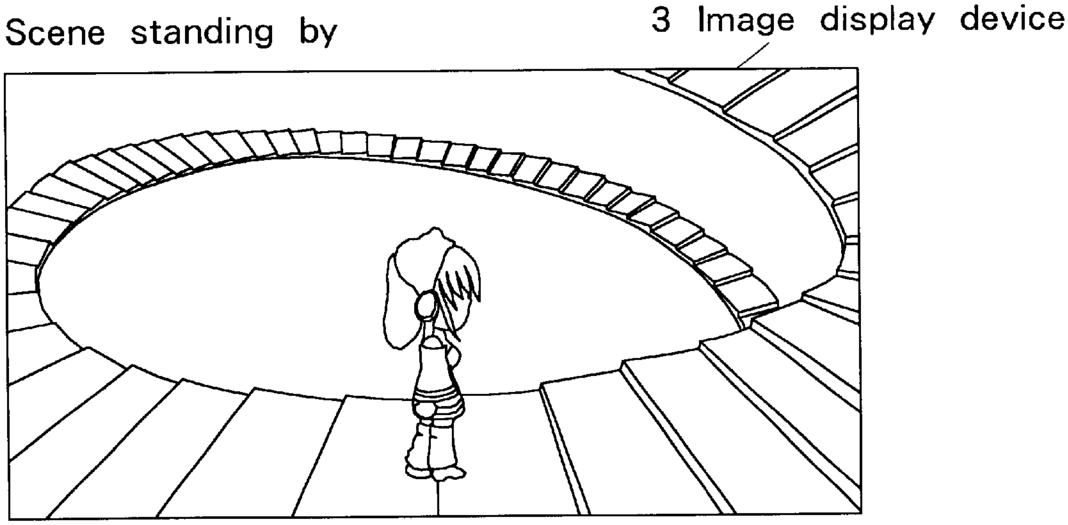
FIG. 15 is an explanatory view showing a scene standing by of an image display device in the second embodiment of the game machine.
Figure 16:
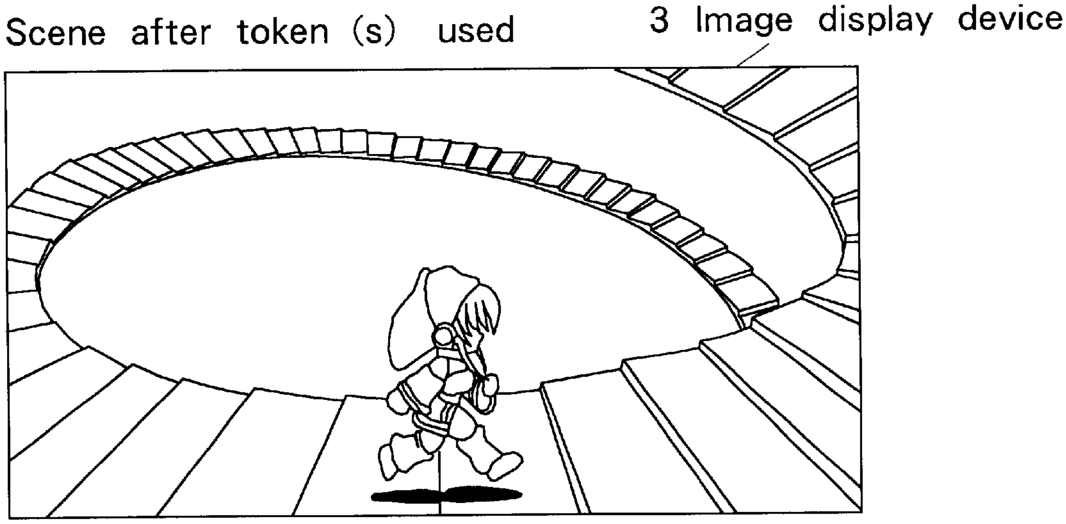
FIG. 16 is an explanatory view for a scene, of the image display device, after tokens used.

As seen in FIG. 15, the image display device 3 shows a scene standingby before start of the game in which a heroine (girl) stands on a spiral. When coins are inserted directly or placed by a bet switch 5 from credit, the heroine moves upstairs as shown in FIG. 16. The background (not shown) behind the spiral may be classified as "woods" a lowest level 1 for beginners, "continent" a level 2 for those slightly advance, "Sea of clouds" a level 3 for middle-grade players, and "Sky and stars" a level 4 for advanced players. When electric source is turned on, the game starts from the level 1 after a predetermined time from a preceding game.

According to the points addition table for specific levels, after stopping all the wheels, points for facilitating to improve levels depending upon achievement of winning styles corresponding to the internally determined flag are added for each level 1 to 4. To the contrary, depending upon failure in winning corresponding to the internally determined flag, points are deducted to make level down.

As seen in FIG. 18, the cumulative points 50 or less are level 1 for beginners, 51 to 100 level 2 for slightly advanced, 101 to 150 level 3 for middle-grade, and 151 or more level 4 for advanced players. Upon turing on the source or after a predetermined time from a preceding game, an initial point is zero.

As seen in the table for selection of the informing features for specific levels in FIG. 19, at the level 4 for advanced players, the whole extent 128 of random numbers 0 to 127 obtained by use of R resister of a microcomputer CPU is allocated in a section of no informing, so that an internally determined flag is not informed in a next game. At levels 1 to 3, internally determined flags in a predetermined feature is informed for each level on the image display device 3 according to predetermined allocation sections including random numbers for selection and informing features correspondingly to the internally determined flag. The tables shown in FIGS. 17 to 19 are monitored on the ROM of the control device.

The bearer carrying the informing appears at the levels 1 to 3. As seen in FIG. 20, in level 1 for the absolute beginners, a matured large bearer giving impression as superior in leadership corresponding to a kind informing with high reliability is used, in level 2 used is a middle-sized child corresponding to the informing of slightly lowered reliability, and in level 3 for middle grade a small infant corresponding to the informing made not so frequently with lowered reliability.

Items of informing is handed over by the bearer to the heroine. Among the shield-shaped Items shown in FIG. 19, A includes Grape corresonding to the winning style "Grape", B a "Bird" corresponding to "Feather-Feather-Bird", C a Feather to "Feather-Feather-Feather", D a Cherry to two or four coins Cherry, E a Red Seven to Big or Regular Bonus, kinds of internally determined flags being capable of being guessed from the items. F is commonly used for internally determined flag having a shield only.

Figure 21:
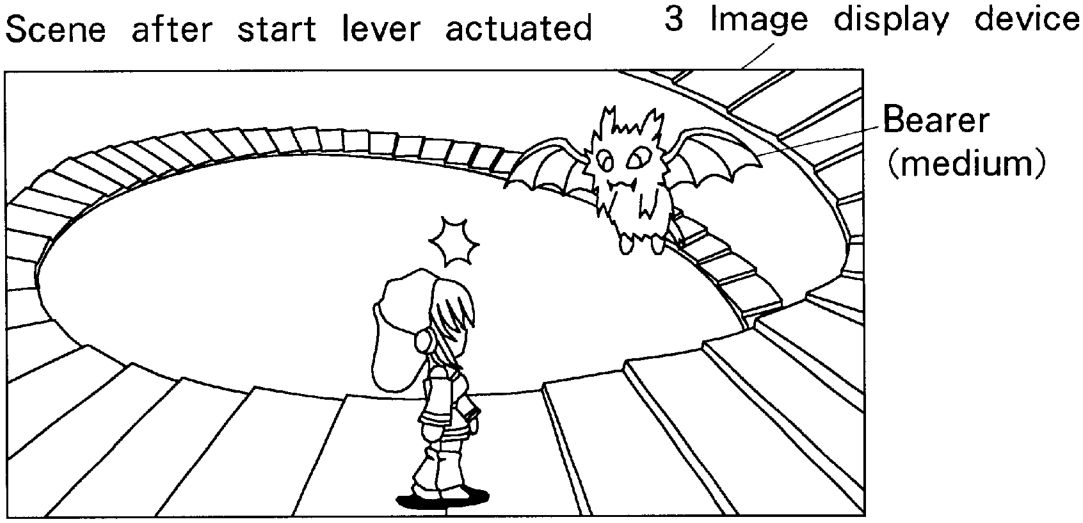
FIG. 21 is an explanatory view for a scene, of the image display device, after operation of the start lever.

When points in a preceding game is 51 to 100 at level 2, and the start lever 6 is operated this time to cause an internally determined flag one-coin "Feather-Feather-Bird" is formed from internal winning determination, and the item B corresponding to the one coin "Feather-Feather-Bird" is selected by allocating-selection with random number selection. Simultaneously with or slightly delayed from start of rotation of the wheels, as shown in FIG. 21, the middle-sized, child bearer appears with winging.

Figure 22:
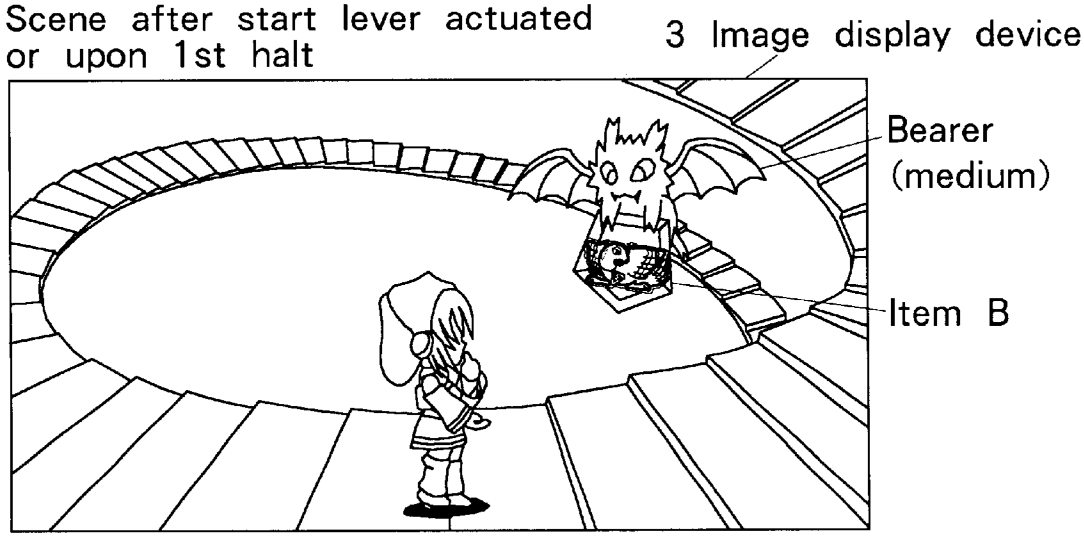
FIG. 22 is an explanatory view for a scene of the image display device upon first halt.
Figure 23:
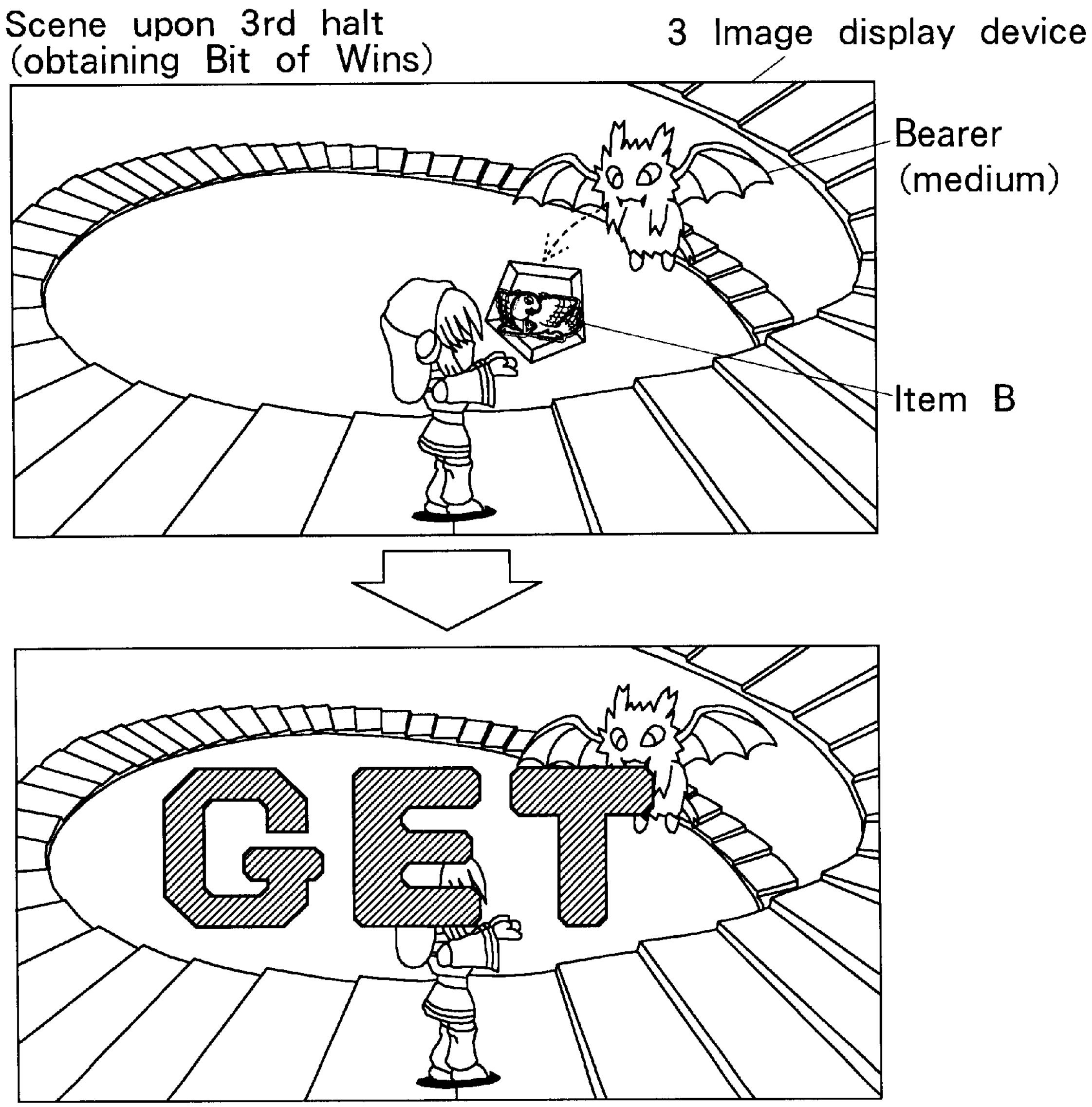
FIG. 23 is an explanatory view for a scene, of the image display device, upon winning Bit of Wins on third halt.

Consequently, or, upon a first halt at which any stop button 4L, 4C, 4R has been pushed, as shown in FIG. 22, the bearer is about to hand the item B over the heroine. And as seen in FIG. 23, upon a third halt when the last stop button is operated, when "Feather-Feather-Bird" are aligned on the effective winning line and winning can be achieved, the bearer throws the item B to the girl and the characters GET appears. Points are added by 10 and renewed as seen in FIG. 17.

Figure 24:
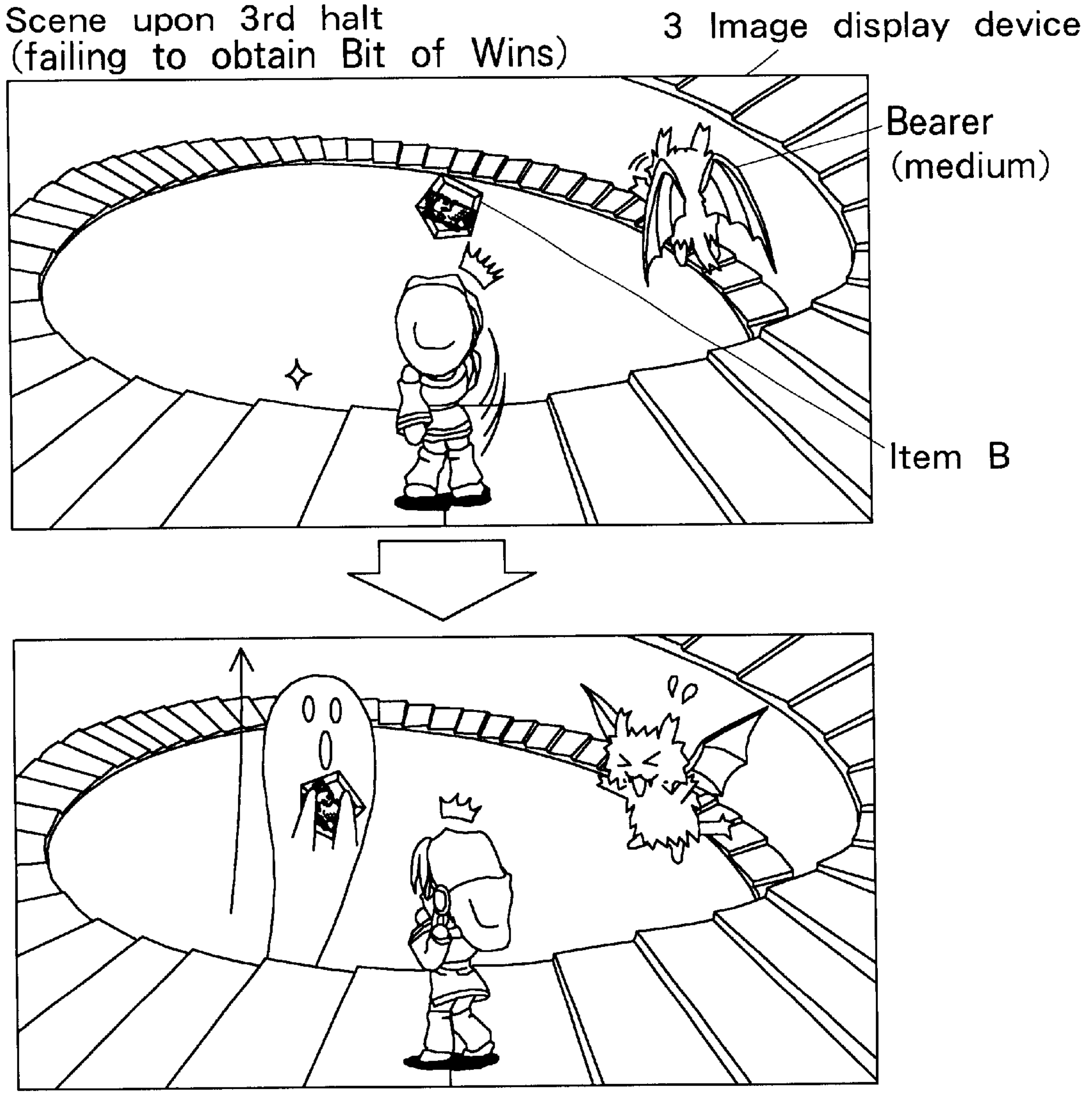
FIG. 24 is an explanatory view for a scene of the image display device upon failure in winning on the third halt.

If poor in operating timing of the stop button and "Feather-Feather-Bird" is not achieved on the winning line to fail to win the wins, the bearer throws the item B to the midst of the spiral and a ghost takes the item B and disappears as shown in FIG. 24. In this case, points are deducted by two and renewed as seen in FIG. 17.

The exemplified animation pictures are almost similar in levels 1 to 3. In the level 1 for the beginners, the internally determined winning styles of Bit of Wins and the item completely correspond to each other, but, bonus flag of Big (BB) or Regular (RB) bonuses are not to be informed as blank. If no informing is carried out, aiming "Red Seven" will do, which can be easily understood. BB and RB may be subjected to the informing.

In level 2 for the slightly advanced beginners, when any internally determined flag is achieved, it is inevitably informed, and the internally determined flag and the item necessarily correspond to each other, but there would be false informing wherein any item not corresonding to the internally determined flag would be informed. In the level 3 for middle-grade, the item F commonly used for the internally determined flag appears at a lower frequency, so that kinds of the internally determined flag cannot be perceived. In level 4 for advanced players, there appears no bearer and items, informing the internallye determined winning styles are not at all carried out, so that they should play relying on DDT method and the arrangement of designs being about to become winning.

In the above feature, two and four coins Cherry are informed by use of a common item D but alternatively may be separately informed with respective items, for example, a shield having a three-fruits Cherry as item D for two coins Cherry and two of three-fruits Cherry for four coins one. Bonus maybe similarly delt, for example, BB may be informed with a shield having Red Seven as item E and RB with that having BAR. Also, Replay may be included in the internally determined winning styles subjected to informing at each level.

Accordingly, beginners who have much failure in winning the wins and be at lower level could be given kind informing at higher reliability of the internally determined flag and of what designs to be aimed at with bushing the stop button. Hence, the beginners apt to fail to win Bit of Wins, and slightly advanced beginners can be assisted properly to save their disadvantage in the game.

As seen in FIG. 17, the points addition from the lowest level 1 to the level 2 are set to be higher over the internally determined flags, and points deduction from the highest level 4 to the second high level 3 are made higher. Hence, beginners and slightly advanced ones are given kind and careful support (to be slightly over-protected) in a certain term but not forever. Advanced players when become low in skill can be given the support through the informing of the internally determined winning styles. Hence, the invention can apply the support fairly and properly to all of the beginners and advanced players correspondingly to their skills.

What we claimed is:

1. A game machine having a support means for assisting players in improving their game-playing skill in order to improve their ability to play a game and a support allowing means that actuates the support means on the basis of a latest game history going back from a latest time, further comprising plural lines of a changeable indication means which changeably indicates a plurality of designs including those corresponding to Bonus, and a stop means for stopping a predetermined design of each line on a winning line corresponding to an operation timing, wherein the support means causes designs for Bonus to be aligned on the winning line when the Bonus designs are not aligned on the winning line, and wherein the support allowing means determines whether a winning Bonus is internally determined and flagged after a predetermined number of games from a first game and, if no winning Bonus has been internally determined and flagged after the predetermined number of games from the first game, actuates said support means, and wherein the support means additionally displays a game history between Bonuses when the Bonus designs are aligned on the winning line to realize a winning Bonus.

2. A game machine as set forth in claim 1 wherein the changeable indication means further provides a winning style of Big Bonus that is a combination of effective usual games in limited times and a Regular Bonus in limited times and ends depending on predetermined limitations; and wherein the support allowing means actuates a further support means useful for increasing a benefit to be obtained when provided benefits are few during Big Bonus in a latest game history.

3. A game machine as set forth in claim 4, wherein actuation of a still further support means useful for estimation of the game is allowed when Big Bonus ends in a latest game history.

4. A game machine as set forth in claim 1, wherein the changeable indication means further indicates plural designs for Bit of Wins; and wherein the game machine allows actuation of said support means when Bonus is not achieved again after a predetermined number of games from ending of a preceding Bonus-winning in a latest game history.

* * * * *